United States Patent [19]
Saito

[11] Patent Number: 6,018,352
[45] Date of Patent: *Jan. 25, 2000

[54] LINE SYMMETRICAL GRAPHIC ARRANGEMENT DEVICE

[75] Inventor: Shigeru Saito, Tokyo, Japan

[73] Assignee: NEC Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/710,766

[22] Filed: Sep. 20, 1996

[30] Foreign Application Priority Data

Sep. 20, 1995 [JP] Japan .................................. 7-241858

[51] Int. Cl.[7] .................................................. G06T 11/60
[52] U.S. Cl. .................................................. 345/438
[58] Field of Search .................................. 345/433, 438, 345/441, 121; 382/186, 203

[56] References Cited

U.S. PATENT DOCUMENTS

| | | | |
|---|---|---|---|
| 4,797,842 | 1/1989 | Nackman et al. .................. | 345/420 X |
| 4,933,865 | 6/1990 | Yamamoto et al. ................. | 382/203 |
| 5,426,729 | 6/1995 | Parker .................................. | 345/441 |
| 5,463,696 | 10/1995 | Beernink et al. .................. | 382/186 |
| 5,506,948 | 4/1996 | Onitake et al. ..................... | 348/438 |
| 5,877,774 | 3/1999 | Saito .................................. | 345/440 |

FOREIGN PATENT DOCUMENTS

| | | |
|---|---|---|
| 63-261481 | 10/1988 | Japan . |
| 406203135 | 7/1994 | Japan . |
| 408221590 | 8/1996 | Japan . |

*Primary Examiner*—Mark K. Zimmerman
*Attorney, Agent, or Firm*—Foley & Lardner

[57] ABSTRACT

A line symmetrical graphic arrangement device comprising a graphic input unit for entering graphic data, a symmetry axis input unit for entering data of a symmetry axis, an arrangement processing instructing unit for instructing to perform an arrangement processing on an input graphic, a symmetry judging unit for judging whether the input graphic is substantially line symmetric or not with respect to the symmetry axis, on the basis of the graphic data and the data of the symmetry axis, according to a predetermined criterion, a symmetrizing processing unit for editing the input graphic judged to be substantially line symmetric so as to be accurately line symmetric with respect to the symmetry axis on the basis of the graphic data and the data of the symmetry axis, and an output device for displaying the arranged graphic.

11 Claims, 26 Drawing Sheets

GRAPHIC INPUT

MIRROR MODE SPECIFICATION

SPECIFICATION OF THE CENTER OF MIRROR

FINISH

LINE SYMMETRICAL GRAPHIC ARRANGEMENT DEVICE

BACKGROUND OF THE INVENTION

1. Field of the Invention

The present invention relates to a line symmetrical graphic arrangement device. More specifically, it relates to a line symmetrical graphic arrangement device capable of automatically arranging input graphics into line symmetrical figures, and modifying the positional relation among a plurality of input graphics so that they may stand in the line symmetrical relation with respect to a certain reference line.

2. Description of the Related Art

In such a conventional technique as processing image data by the use of a computer, like a CAD system, image data is processed by, for example, graphic software running on a personal computer.

In this kind of the conventional technique using graphic software, such an interface is generally used that a desired function is executed by entering a desired command selected from a menu displayed on a display or the like by the use of input means such as a mouse. Specifically, a desired command is selected from various commands prepared as a menu of "Draw" for drawing graphics, e.g. "Straight Line", "Rectangle", "Parallelogram", "Circle", "Curve", "Locus", "Painting" and "Regular Polygon", and various commands prepared as a menu of "Edit" for editing graphics, e.g. "Copy", "Move", "Delete", "Deform", "Mirror", "Turn" and "Compose". Some commands are entered so as to execute graphical drawing and editing. For example, the "Rectangle" command is selected from the menu of "Draw", and a predetermined entry such as the specification of the location of the rectangle is performed. As a result, a rectangle is displayed on the screen of a display device.

In case of entering a line symmetrical graphic by this conventional technique, for example, an operator can draw and enter a desired line symmetrical graphic, with "Grid" displayed on a screen, while confirming the position of coordinates with reference to the displayed grid. Or a line symmetrical graphic can be entered by the use of a command of reversing an entered graphic symmetrically (hereinafter, referred to as "Mirror" command).

At this time, a method of entering a line symmetrical graphic by the use of the "Mirror" command will be described with reference to FIG. 23.

On a graphic which an operator wants to enter (a house with a gable roof in this example), one side portion 101 thereof with respect to the symmetry axis is only entered at first ((A) in FIG. 23). If "Mirror" command is selected, a sub-command 102 will appears, to specify a method for appointing the graphic he wants to reverse and to specify whether the original graphic is kept or not ((B) in FIG. 23). At this time, when one side portion 101, which has been entered, is specified and the mode "Keep original graphic" is selected ((B) in FIG. 23), another side portion 103 is created symmetrically with respect to the symmetry axis 104 ((C) in FIG. 23), so that the desired symmetrical graphic 105 is obtained ((D) in FIG. 23). In case of arranging a plurality of graphics so as to be in the line symmetric positional relation, the same way as mentioned above can be used.

As other conventional technique for processing image data by the use of a computer, for example, "A Method of Recognizing Symmetry of Graphics in a Graphic Recognizing Device" is disclosed in Japanese Patent Laid-Open No. 63-261481. The constitution of the conventional technique described in the same is shown in FIG. 24. As shown in FIG. 24, a graphic recognizing device according to the conventional technique can recognize a drawing drawn by the mnemonic operation method. It has a function for supplementing measures not described in the drawing, and comprises a graphic recognizing device 106, a symmetry segment candidate extracting means 107, a vertical segment setting means 108, an arithmetic means 109, and a graphic information setting means 110. The graphic recognizing device 106 comprises a readout processing unit 111, an image data storing unit 112, a vector processing unit 113, a vector classification processing unit 114, a symbol recognition processing unit 115, a segment discrimination processing unit 116, a character recognition processing unit 117 and a recognition result storing unit 118.

An operation of this conventional technique will be described with reference to FIGS. 24 to 27. In the graphic recognizing device 106, a drawing 119, including characters, symbols, center lines and the like, which is entered from the readout processing unit 111, is stored into the image data storing unit 112 as image data. The vector processing unit 113 reads out the image data stored into the image data storing unit 112, performs a polygonal line approximation on the image data, converts the image data into vector data, and enters the data into the vector classification processing unit 114. The vector classification processing unit 114 classifies the entered vector data into a symbol, character, and segment, and supplies each data classified into a symbol, character, and segment to the symbol recognition processing unit 115, the segment discrimination processing unit 116 and the character recognition processing unit 117 respectively. The segment discrimination processing unit 116 further classifies the vector data showing a segment into a shape line, a center line and the like by the type of segment, and stores the result into the recognition result storing unit 118. The symbol recognition processing unit 115 and the character recognition processing unit 117 recognize symbols and characters respectively, so to store the data into the recognition result storing unit 118 with attributes attached thereto according to the recognition result.

As shown in the flow chart of FIG. 25, the symmetry segment candidate extracting unit 107 extracts the data on some center lines which are possible to serve as symmetry axes from the recognition result storing unit 118 at first (Step 2501), and computes the number of center lines (Step 2502). As for each of the extracted center lines, the unit 107 checks whether there are any shape lines intersecting the center line, or any shape lines of graphics isolated from the center line (Steps 2503 and 2504). When such a center line exists as mentioned above, the vertical segment setting means 108 and the arithmetic means 109 are used in order to check the shape lines, and the symmetric positional relation among the isolated graphics (Step 2505).

A method of judging symmetric condition will be explained with reference to FIG. 26. The vertical segment setting means 108 draws a perpendicular line L2, for example, from an endpoint P2 of a vector to the center line Q1, while the arithmetic means 109 acquires the distance d2 from the endpoint P2 to M1, which is on the perpendicular line L2, and further acquires the distance m2 from M1 to the intersection x2 on the vector C2 where the perpendicular line L2 comes across the vector C2. The difference between the distance d2 and m2 is calculated. If the result satisfies the following formula (1) with regard to the constant threshold level (Δd/2), the similar calculation will be sequentially performed with regard to the other endpoints P3 and the like of the other vectors.

$$|d2-m2|<\Delta d/2 \tag{1}$$

When the formula (1) is satisfied as for all the end points P2, P3, etc. and the total value $\Sigma|dn-mn|$ of each difference of the distance satisfies the following formula (2) with regard to the constant threshold level Q, the shape lines are judged to be symmetrical with respect to the center line Q1.

$$\Sigma|dn-mn|<Q \tag{2}$$

As illustrated in FIG. 27, in the routine of judging a symmetry axis and the symmetric positional relation between isolated graphics, the vertical segment setting means 108 draws a perpendicular line L from an endpoint P of a vector to a center line Q2, while the arithmetic means 109 acquires the distance D from the endpoint P to M2 on the perpendicular L, and further acquires the respective distance s and s' from M2 to the respective intersections X and X' on the vectors C and C' coming across the perpendicular line L. The difference between the distance s and D, and the difference between the distance s' and D are respectively computed. If the above formula (1),is satisfied as for the intersection where the difference is smaller, the similar calculation is performed as for the other endpoints. When the total value of the difference of each distance satisfies the above formula (2), the two graphics (isolated figures) are judged to be symmetrical with respect to the center line Q2 (Steps 2505 and 2506). When a shape line having symmetrical relation is extracted after the completion of symmetry judgement as for all the center lines, the graphic information setting means 110 sets up the graphic information of the other party (which is omitted), on the basis of the graphic information of this party, which is attached to the shape line having symmetrical property (Step 2507).

The first conventional technique by the use of a graphic software as mentioned above, however, has a drawback in that it is difficult to enter a line symmetrical graphic meeting an operation's intention when the line symmetrical graphic to be entered is complicated. This is why, in the input method of drawing a graphic referring to the grid, an operator should enter the graphic with meticulous care, counting squares of the grid to make each vertex symmetric. Also, in the case of entering a line symmetrical graphic including curve, it is very difficult to symmetrize the curved shapes with the grid only. In the input method by the use of "Mirror" command, it is difficult to grasp the whole figure of a complicated graphic by only one side portion thereof that has been entered, so that an operator cannot draw a desirable line symmetrical graphic meeting as he wants.

The second conventional technique by which the shape of an input graphic and the symmetric positional relation are judged, has another drawback in that line symmetry cannot be recognized when the center lines have not been described in the predetermined type of line and when there is no description of the center lines because only the center lines described in the predetermined type of line are regarded as the candidates for the symmetry axes. When there are a lot of center lines described on the input graphic, there exist a lot of candidates for the symmetry axes. Therefore, it takes much time in the process of selecting which symmetry axis candidates to select, which results in decreasing the processing speed.

SUMMARY OF THE INVENTION

The first object of the present invention is to provide a line symmetrical graphic arrangement device capable of editing input graphics into a desired line symmetrical state promptly, by performing the automatic arrangement of the graphics and the automatic modification of the positional relation among a plurality of graphics.

The second object of the present invention is to provide a line symmetrical graphic arrangement device capable of decreasing an operator's labor extremely, by performing the automatic graphic arrangement of the graphics and automatic modification of the positional relation among the graphics with respect to at least one created symmetry axis.

The third object of the present invention is to provide a line symmetrical graphic arrangement device capable of editing graphics satisfactory for the needs of an operator very carefully, by selecting only the graphics specified by an operator to perform the arrangement of the graphics and the modification of the positional relationship among the graphics and by keeping the original shape as for the other figure.

The fourth object of the present invention is to provide a line symmetrical graphic arrangement device capable of editing graphics satisfactorily for the needs of an operator more carefully, by performing the arrangement of the graphics and the modification of the positional relation among the graphics according to the graphic data specified by an operator as a reference.

According to one aspect of the invention, a line symmetrical graphic arrangement device for automatically arranging an input graphic into a line symmetrical shape and displaying the arranged graphic, the arrangement device comprises:

a graphic input means for entering graphic data;

a graphic data storing means for storing the graphic data entered from the graphic input means;

a symmetry axis input means for entering data of a symmetry axis;

a symmetry axis storing means for storing the data of the symmetry axis entered from the symmetry axis input means;

an arrangement processing instructing means for instructing to perform an arrangement processing on the input graphic;

a symmetry judging means for, in reply to an instruction of the arrangement processing instructing means, judging whether the input graphic has a substantially line symmetrical shape or not with respect to the symmetry axis, on the basis of the graphic data stored in the graphic data storing means and the data of the symmetry axis stored in the symmetry axis storing means, according to a predetermined criterion;

a symmetrizing processing means for editing the input graphic judged to be substantially line symmetric by the symmetry judging means so as to be accurately line symmetric with respect to the symmetry axis, on the basis of the graphic data stored in said graphic data storing means and the data of the symmetry axis stored in the symmetry axis storing means; and an output means for displaying the graphic arranged by the symmetrizing processing means.

In the preferred construction, the symmetry judging means judges whether the input graphic has a substantially line symmetrical shape or not with respect to the symmetry axis where the input graphic passes, and the symmetrizing processing means arranges the input graphic judged to have a substantially line symmetrical shape by the symmetry judging means into an accurate line symmetrical shape with respect to the symmetry axis.

In the preferred construction, the symmetry judging means judges whether a plurality of the input graphics have a substantially line symmetric positional relation or not with respect to the symmetry axis intervening between the input graphics, and the symmetrizing processing means arranges the shapes of the input graphics and modifies the positions thereof so that the input graphics judged to have the substantially line symmetric positional relation by the symmetry judging means may be in the accurate line symmetric positional relation with respect to the symmetry axis.

In the preferred construction, the symmetry judging means judges whether the input graphic has a substantially line symmetrical shape or not with respect to the symmetry axis where the input graphic passes and judges whether a plurality of the input graphics have a substantially line symmetric positional relation or not with respect to the symmetry axis intervening between the input graphics, and the syinmetrizing processing means arranges the input graphic judged to have a substantially line symmetrical shape by said symmetry judging means into an accurately line symmetrical shape with respect to the symmetry axis and arranges the shapes of the input graphics and modifies the positions thereof so that the input graphics judged to have the substantially line symmetric positional relation by said symmetry judging means may be in the accurate line symmetric positional relation with respect to the symmetry axis.

In another preferred construction, the line symmetrical graphic arrangement device further comprises a target graphic instructing means for specifying a target graphic to be arranged, from a plurality of the input graphics entered by said graphic input means, in which device the symmetry judging means judges, as for the target graphic specified by said target graphic instructing means, whether the target graphic is substantially line symmetric or not with respect to the symmetry axis.

In another preferred construction, the line symmetrical graphic arrangement device further comprises a target graphic instructing means for specifying a target graphic to be arranged, from a plurality of the input graphics entered by the graphic input means, in which device the symmetry judging means judges, as for the target graphic specified by said target graphic instrucing means, whether the target graphic is substantially line symmetric or not with respect to the symmetry axis, and the symmetrizing processing means arranges the input graphic judged to have the substantially line symmetrical shape by the symmetry judging means into an accurate line symmetrical shape with respect to the symmetry axis.

In another preferred construction, the line symmetrical graphic arrangement device further comprises a target graphic instructing means for specifying a target graphic to be arranged, from a plurality of the input graphics entered by the graphic input means, in which device the symmetry judging means judges, as for the target graphic specified by said target graphic instructing means, whether the target graphic is substantially line symmetric or not with respect to the symmetry axis, and the symmetrizing processing means arranges the shapes of the input graphics and modifies the positions thereof so that the input graphics judged to have the substantially line symmetric positional relation by the symmetry judging means may be in the accurately line symmetric positional relation with respect to the symmetry axis.

In another preferred construction, the line symmetrical graphic arrangement device further comprises a target graphic instructing means for specifying a target graphic to be arranged, from a plurality of the input graphics entered by the graphic input means, in which device the symmetry judging means, as for the target graphic specified by the target graphic instructing means, judges whether the target graphic is substantially line symmetric or not with respect to the symmetry axis and judges whether a plurality of the target graphics have a substantially line symmetric positional relation with respect to the symmetry axis intervening between the input graphics, and the symmetrizing processing means arranges the input graphic judged to have the substantially line symmetrical shape by the symmetry judging means into an accurately line symmetrical shape with respect to the symmetry axis and arranges the shapes of the input graphics and modifies the positions thereof so that the input graphics judged to have the substantially line symmetric positional relation by the symmetry judging means may be in the accurately line symmetric positional relation with respect to the symmetry axis.

In another preferred construction, the line symmetrical graphic arrangement device further comprises a reference element instructing means for specifying a predetermined data from the graphic data stored in said graphic data storing means, in which device the symmetrizing processing means edits the graphic with reference to the graphic data by said reference element instructing means.

In another preferred construction, the line symmetrical graphic arrangement device further comprises a target graphic instructing means for specifying a target graphic to be arranged, from a plurality of the input graphics entered by the graphic input means; and a reference element instructing means for specifying a predetermined data from the graphic data stored in the graphic data storing means; in which device the symmetry judging means judges whether the target graphic specified by the target graphic instructing means is substantially line symmetric or not with respect to the symmetry axis, and the symmetrizing processing means edits the graphic with reference to the graphic data by the reference element instructing means.

According to another aspect of the invention, a line symmetrical graphic arrangement device for automatically arranging an input graphic into a line symmetrical shape and displaying the arranged graphic, the arrangement device comprises:

a graphic input means for entering graphic data;

a graphic data storing means for storing the graphic data entered from said graphic input means;

an arrangement processing instructing means for instructing to perform an arrangement processing on the input graphic;

a symmetry axis creating means for automatically creating a symmetry axis according to a predetermined rule, when an instruction is issued by the arrangement processing instructing means;

a symmetry axis storing means for storing the data of the symmetry axis created by the symmetry axis creating means;

a symmetry judging means for, in reply to the instruction of the arrangement processing instructing means, judging whether the input graphic has a substantially line symmetrical shape or not with respect to the symmetry axis, on the basis of the graphic data stored in the graphic data storing means and the data of the symmetry axis stored in the symmetry axis storing means, according to a predetermined criterion;

a symmetrizing processing means for editing the input graphic judged to be substantially line symmetric by the symmetry judging means so as to be accurately line symmetric with respect to the symmetry axis, on the basis of the graphic data stored in said graphic data storing means and the data of the symmetry axis stored in said symmetry axis storing means; and an output means for displaying the graphic arranged by the symmetrizing processing means.

In the preferred construction, the symmetry judging means judges whether the input graphic has a substantially line symmetrical shape or not with respect to the symmetry axis where the input graphic passes, and the symmetrizing processing means arranges the input graphic judged to have a substantially line symmetrical shape by the symmetry judging means into an accurately line symmetrical shape with respect to the symmetry axis.

In another preferred construction, the symmetry judging means judges whether a plurality of the input graphics have a substantially line symmetric positional relation or not with respect to the symmetry axis intervening between the input graphics, and the symmetrizing processing means arranges the shapes of the input graphics and modifies the positions thereof so that the input graphics judged to have the substantially line symmetric positional relation by the symmetry judging means may be in the accurately line symmetric positional relation with respect to the symmetry axis.

In another preferred construction, the symmetry judging means judges whether the input graphic has a substantially line symmetrical shape or not with respect to the symmetry axis where the input graphic passes and judges whether a plurality of the input graphics have a substantially line symmetric positional relation or not with respect to the symmetry axis intervening between the input graphics, and the symmetrizing processing means arranges the input graphic judged to have a substantially line symmetrical shape by the symmetry judging means into an accurately line symmetrical shape with respect to the symmetry axis and arranges the shapes of the input graphics and modifies the positions thereof so that the input graphics judged to have the substantially line symmetric positional relation by the symmetry judging means may be in the accurate line symmetric positional relation with respect to the symmetry axis.

In the above-mentioned construction, the line symmetrical graphic arrangement device further comprises a target graphic instructing means for specifying a target graphic to be arranged, from a plurality of the input graphics entered by the graphic input means, in which device the symmetry axis creating means automatically creates a symmetry axis according to the predetermined rule, as for the target graphic specified by the target graphic instructing means, and the symmetry judging means judges, as for the graphic specified by the target graphic instructing means, whether the target graphic is substantially line symmetric or not with respect to the symmetry axis.

In the above-mentioned construction, the line symmetrical graphic arrangement device further comprises a target graphic instructing means for specifying a target graphic to be arranged, from a plurality of the input graphics entered by said graphic input means, in which device the symmetry axis creating means automatically creates a symmetry axis according to the predetermined rule, as for the target graphic specified by the target graphic instructing means, the symmetry judging means judges, as for the target graphic specified by the target graphic instructing means, whether the target graphic is substantially line symmetric or not with respect to the symmetry axis, and the symmetrizing processing means arranges the input graphic judged to have the substantially line symmetrical shape by said symmetry judging means into an accurate line symmetrical shape with respect to the symmetry axis.

In the above-mentioned construction, the line symmetrical graphic arrangement device further comprises a target graphic instructing means for specifying a target graphic to be arranged, from a plurality of the input graphics entered by said graphic input means, in which device the symmetry axis creating means automatically creates a symmetry axis according to the predetermined rule, as for the target graphic specified by the target graphic instructing means, the symmetry judging means judges, as for the target graphic specified by said target graphic instructing means, whether the target graphic is substantially line symmetric or not with respect to the symmetry axis, and the symmetrizing processing means arranges the shapes of the input graphics and modifies the positions thereof so that the input graphics judged to have the substantially line symmetric positional relation by the symmetry judging means may be in the accurate line symmetric positional relation with respect to the symmetry axis.

In the above-mentioned construction, the line symmetrical graphic arrangement device further comprises a target graphic instructing means for specifying a target graphic to be arranged, from a plurality of the input graphics entered by the graphic input means, in which device the symmetry axis creating means automatically creates a symmetry axis according to the predetermined rule, as for the target graphic specified by the target graphic instructing means, the symmetry judging means, as for the target graphic specified by the target graphic instructing means, judges whether the target graphic is substantially line symmetric or not with respect to the symmetry axis and judges whether a plurality of the target graphics have a substantially line symmetric positional relation with respect to the symmetry axis intervening between the input graphics, and the symmetrizing processing means arranges the input graphic judged to have the substantially line symmetrical shape by the symmetry judging means into an accurately line symmetrical shape with respect to the symmetry axis and arranges the shapes of the input graphics and modifies the positions thereof so that the input graphics judged to have substantially line symmetric positional relation by the symmetry judging means may be in the accurately line symmetric positional relation with respect to the symmetry axis.

In the above-mentioned construction, the line symmetrical graphic arrangement device further comprises a reference element instructing means for specifying a predetermined data from the graphic data stored in the graphic data storing means, in which device the symmetrizing processing means edits the graphic with reference to the graphic data by the reference element instructing means.

In the above-mentioned construction, the line symmetrical graphic arrangement device further comprises a target graphic instructing means for specifying a target graphic to be arranged, from a plurality of the input graphics entered by said graphic input means; and a reference element instructing means for specifying a predetermined data from the graphic data stored in the graphic data storing means; in which device the symmetry axis creating means automatically creates a symmetry axis according to the predetermined rule, as for the target graphic specified by said target graphic instructing means, the symmetry judging means judges, as for the target graphic specified by the target graphic instructing means, whether the target graphic is substantially line symmetric or not with respect to the symmetry axis, and the symmetrizing processing means edits the graphic with reference to the graphic data by the reference element instructing means.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

Preferred embodiments of the present invention will be described with reference to the accompanying drawings. The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail for simplicity.

First Embodiment

Figure 1:
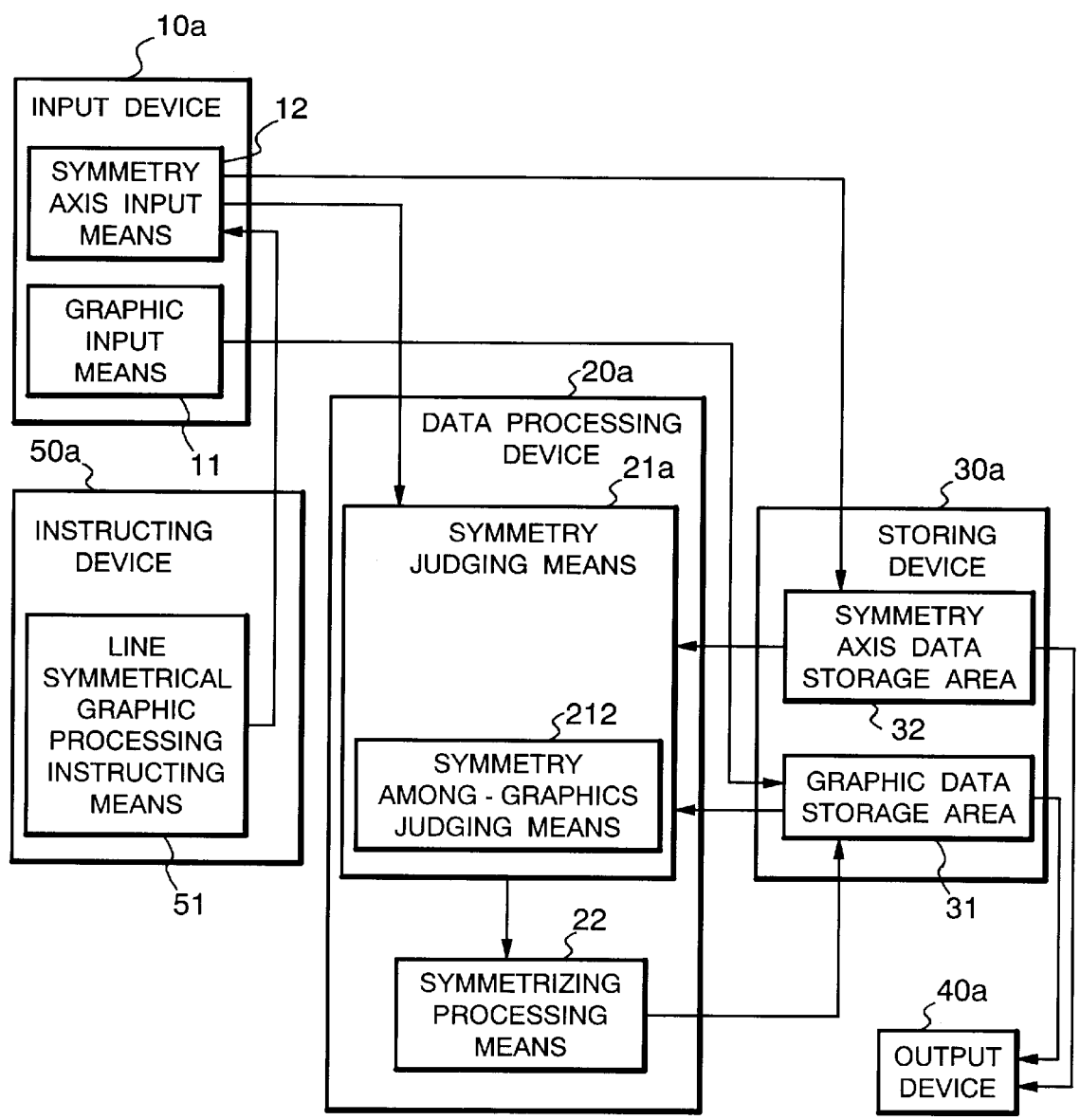
FIG. 1 is a block diagram showing the constitution of a line symmetrical graphic arrangement device of a first embodiment according to the present invention.
Figure 2:
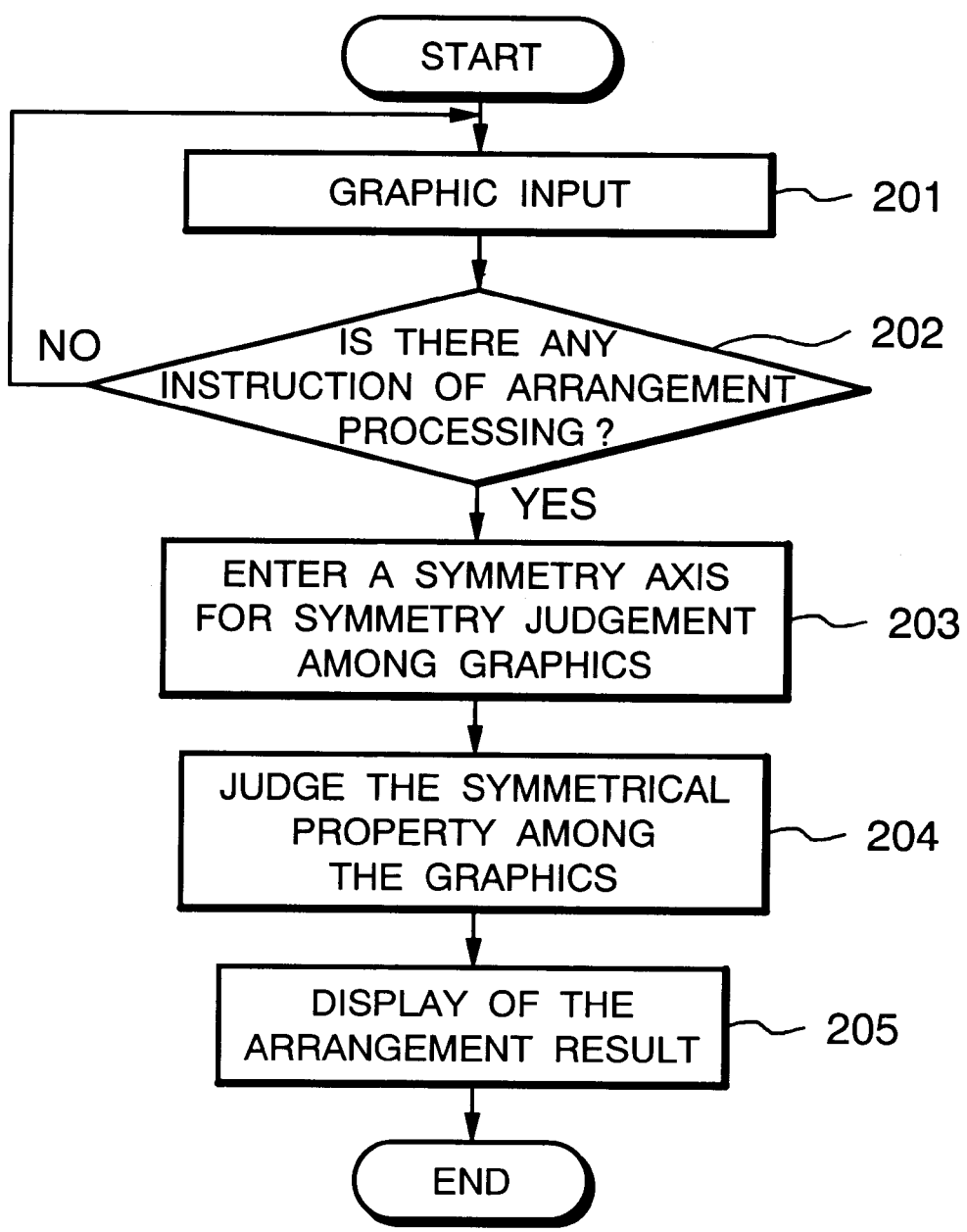
FIG. 2 is a flow chart showing an operation of the first embodiment.
Figure 3A:
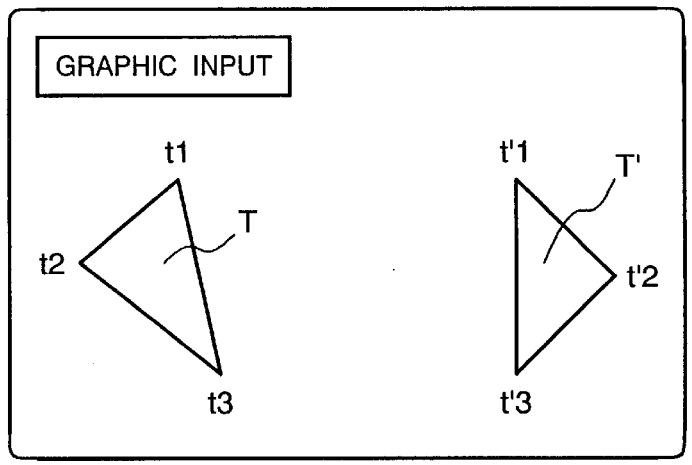
FIG. 3 is a view for use in describing the processing manner according to the first embodiment.
Figure 3B:
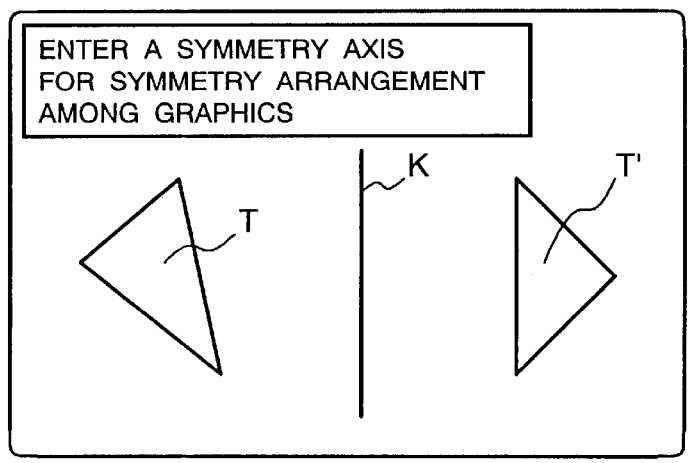
Figure 3C:
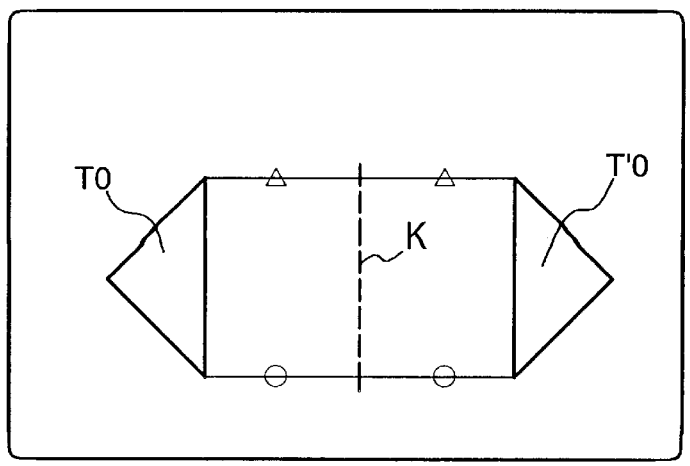
Figure 4:
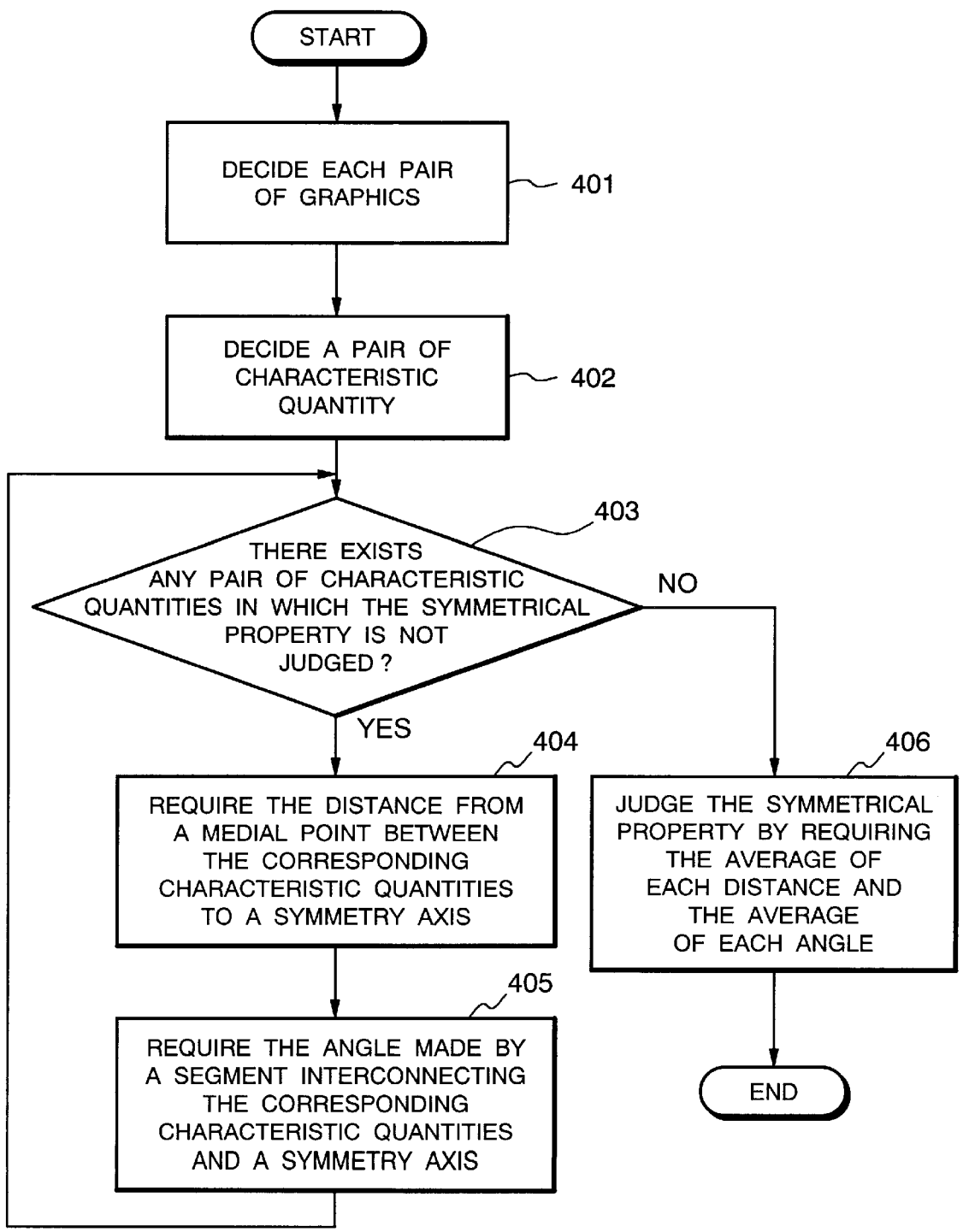
FIG. 4 is a flow chart showing an operation of a symmety among-graphics judging means of the first embodiment.
Figure 5:
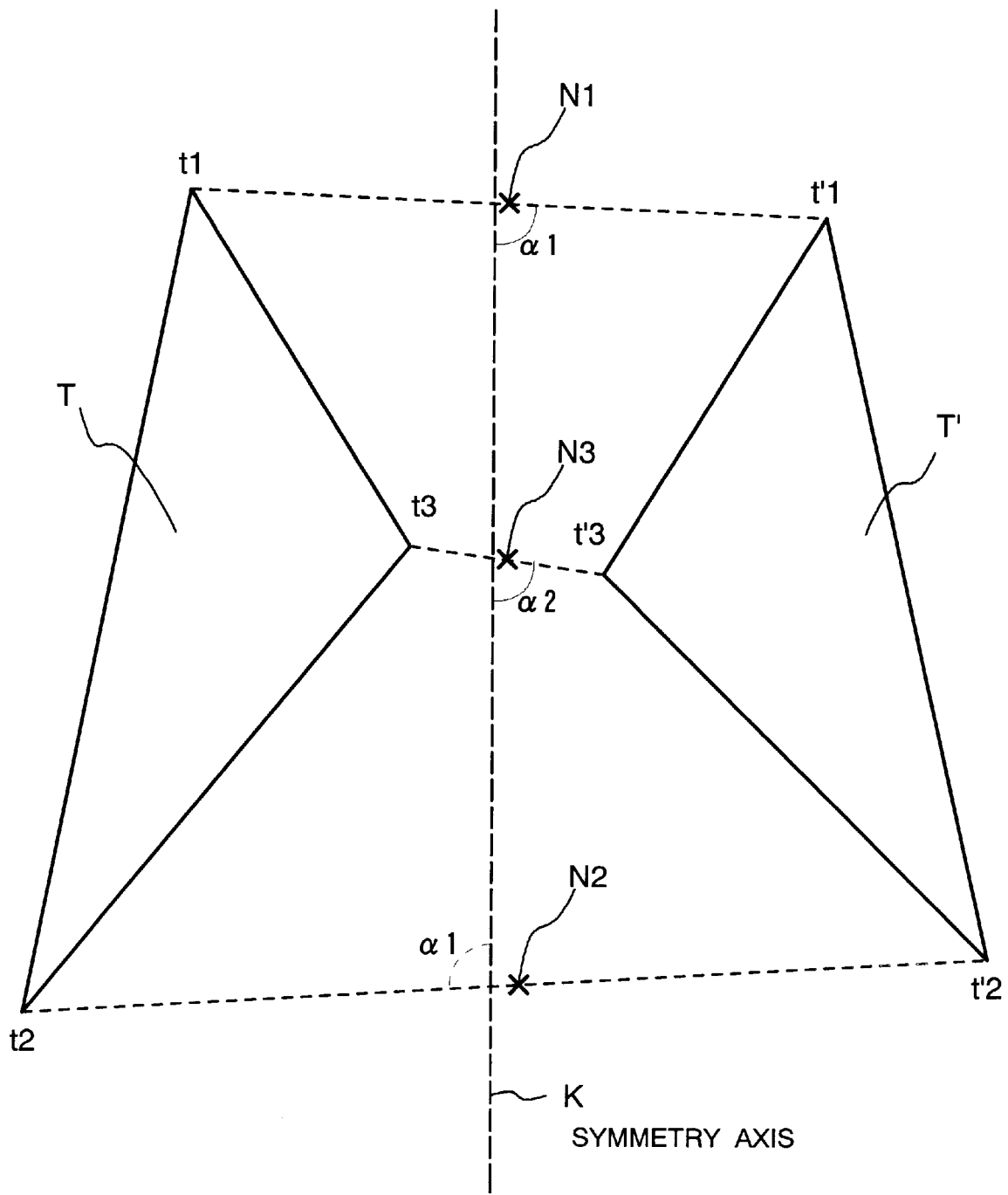
FIG. 5 is a view for use in describing the processing manner according to the symmetry among-graphics judging means of the first embodiment.

FIG. 1 is a block diagram showing the constitution of a line symmetrical graphic arrangement device of a first embodiment according to the present invention; FIG. 2 is a flow chart showing an operation of the same device; FIG. 3 is a view for use in describing the processing manner according to the same device; FIG. 4 is a flow chart showing further detailed operation of the same device; and FIG. 5 is a view for use in describing the further detailed processing manner according to the same device.

The first embodiment shown in FIGS. 1 to 5 is a line symmetrical graphic arrangement device that modifies the positional relation among graphics and arranges the graphics if necessary so that the input graphics can be symmetrized accurately with respect to the symmetry axis, when a plurality of input graphics stand is in the substantially symmetrical relation with respect to a symmetry axis.

As illustrated in FIG. 1, the line symmetrical graphic arrangement device of this embodiment comprises an input device 10a for entering graphic data, a data processing device 20a for performing arrangement of the graphics and modifying of the positional relation thereof, a storing device 30a for storing the graphical data, an output device 40a for displaying the graphics formed from the graphical data and an instructing device 50a for supplying an instruction command to the data processing device 20a. Only particular constitution of this embodiment is shown in FIG. 1, while other general constitution is not shown there.

The input device 10a is realized by various input devices such as a keyboard, a mouse, a scanner, a light pen, a tablet or the like, and enters the graphic data of graphics to be processed by this embodiment. The input device 10a includes a graphic input means 11 for entering graphics and a symmetry axis input means 12 for entering symmetry axes of line symmetrical graphics. As a method of entering graphics by the graphic input means 11, the same method as in the conventional line symmetrical graphic arrangement device can be used, such as a method of sequentially indicating vertexes with a mouse and a method of drawing locus of a graphic with a light pen. Thus, characteristic quantities of a graphic indicating the coordinates of vertexes, the angle and length of a line, the type of a line (straight/curve), or the like is obtained as graphic data of an input graphic.

The data processing device 20a is realized by a CPU or the like of a personal computer and a work station run by program control, and edits the graphic data of an input graphic according to the instruction of an operator entered from the instructing device 50a. The data processing device 20a includes a symmetry judging means 21a for judging line symmetrical relation among the entered graphics and a syimetrizing processing means 22 for arranging the graphics that have been judged to be line symmetric by the symmetry judging unit 21a, into a line symmetrical shape with respect to a symmetry axis. The symmetry judging unit 21a judges to be line symmetric, not only the graphics having accurate line symmetrical shapes or positional relations but also the graphics deviated from the accurate line symmetrical shapes or positional relations within a predetermined range. Then, the symmetrizing processing means 22 arranges the graphics and the position thereof so that the graphics may have accurate line symmetrical shapes or stand in the accurate line symmetric positional relation. The symmetry judging unit 21a includes a symmetry among-graphics judging means 212 as a main part. The details of the symmetry judging process of graphics by the symmetry judging unit 21a will be described below.

The storing device 30a is realized by an external storage such as a magnetic desk, a floppy disk or the like, or an internal storage such as a RAM, a ROM or the like, and stores the graphic data of the graphics to be processed. The storing device 30a includes a graphic data storage area 31 for storing the graphic data entered from the graphic input means 11 and a symmetry axis data storage area 32 for storing the data on the symmetry axes entered from the symmetry axis input means 12.

The output device 40a is realized by a display, a printer or the like. The device 50a receives an instruction command from an operator and gives an instruction to the data processing device 20a. The instructing device 50a includes a line symmetric arrangement processing instructing means 51 for instructing a line symmetric arrangement processing. The instructing device 50a may be physically identified with the input device such as the device 10a.

An operation of this embodiment will be described with reference to the flow chart of FIG. 2 and FIG. 3. Though FIG. 3 shows the case where the positional relation between the two graphics T and T' will be modified into a line symmetrical relation, it is needless to say that the number of graphics to be processed is not restricted to two.

When the graphics T and T' are entered by the graphic input means 11 of the input device 10a (Step 201), all the entered graphics T and T' are stored into the graphic data storage area 31 of the storing device 30a. At this time, various conventional methods as mentioned above can be used as an input method of the graphics T and T'. Characteristic quantities indicating the coordinates of vertexes t1, t2, t3, t'1, t'2, and t'3 of the graphics T and T', the angle and length of each side, the type of line, are stored. When the graphics T and T' are entered into the data processing device 20a, as illustrated in FIG. 3(A), the graphics appear on the screen of the output device 40a as what they are.

On the completion of entering the whole object graphics T and T' to be arranged, an operator gives an instruction to the data processing device 20a so as to perform a line symmetric arrangement by the use of the line symmetric arrangement processing instructing means 51 (Step 202), and enters the symmetry axis K (symmetry axis for judging symmetry among graphics) by the use of the symmetry axis input means 12 of the input device 10a (Step 203). The entered symmetry axis K is stored in the symmetry axis data storage area 32 of the storing device 30a and displayed on the screen of the output device 40a as illustrated in FIG. 3(B). Then, the symmetry among-graphics judging means 212 judges, as for the entered graphics T and T', whether the shapes of the graphics and the positional relation therebetween are symmetric with respect to the symmetry axis K (Step 204).

At a result of this judgement, if the conclusion that the graphics have symmetry is obtained, the symmetrizing processing means 22 modifies the graphic data so that the shapes of the graphics T and T' and the positional relation therebetween may be accurately line symmetric, alters the characteristic quantities such as the coordinates of the vertexes t1, t2, t3, t'1, t'2, and t'3 stored in the graphic data storage area 31 and updates the contents stored in the graphic data storage area 31. Based on the characteristic quantities after update, the graphics T0 and T'0 which have been modified to be located in the line symmetrical relation and to have the line symmetrical shapes, are displayed on the output device 40a as illustrated in FIG. 3(C) (Step 205).

An operation of the symmetry among-graphics judging means 212 will be further described in detail with reference to the flow chart of FIG. 4 and FIG. 5.

The symmetry among-graphics judging means 212 makes a pair of the entered graphics T and T' having the symmetry axis K intervening therebetween (Step 401). When there are a lot of entered graphics, the means 212 selects each pair of graphics having the symmetry axis K intervening therebetween as for all the entered graphics. In the case of judging which graphics to be selected as a pair by the symmetry among-graphics judging means 212, efficiency and speed-up can be improved by the judgement of the means 212 whether the angle (inferior angle) made by the segment interconnecting the two corresponding characteristic quantities (vertexes) of the two graphics and the symmetry axis K is larger than the predetermined reference angle. More specifically, when the angle made by the segment interconnecting the corresponding characteristic quantities (vertexes) of the two graphics and the symmetry axis K is smaller than the reference angle, it is clear that these two graphics are not located in the symmetrical relation and the means 212 doesn't make a pair of these two graphics. In this way, symmetrical relation is checked as for each pair of graphics.

The symmetry among-graphics judging means 212 decides a pair of characteristic quantities this time, in order to check the symmetry in the two graphics extracted as a pair (Step 402). As illustrated in FIG. 5, the means 212 selects each pair of the vertexes (t1, t'1), (t2, t'2) and (t3, t'3) when the two graphics T and T', which pair are objects of symmetry judgement and located on the both sides of the symmetry axis, are triangular.

The symmetry among-graphics judging means 212 requires the medial point N1 between the two characteristic quantities t1 and t'1 which pair are one of the extracted pair of characteristic quantities and requires the distance from the medial point N1 to the symmetry axis K (Step 404). The means 212 further requires the angle α1 made by the segment interconnecting the two characteristic quantities t1 and t'1 and the symmetry axis K (Step 405). The maximum value of the angle α1 is 90°.

After performing the process of Steps 404 and 405 on all the pairs of the characteristic quantities (t2, t'2) and (t3, t'3), the symmetry among-graphics judging means 212 requires the average value of each distance between the symmetry axis K and the respective medial points N1, N2 and N3, and the average value of each angle α1, α2, α3 made by the symmetry axis K and the respective segments interconnecting the two characteristic quantities (t1, t'1), (t2, t'2) and (t3, t'3) respectively. When the average value of each distance between each medial point and the symmetry axis is the predetermined threshold level close to zero and below, and the average value of each angle made by each segment interconnecting each pair of characteristic quantities and the symmetry axis is the predetermined threshold level close to 90° and above, the shapes of the graphics and the positional relation thereof is judged to be symmetric (Steps 403 and 406).

When the symmetry among graphics judging means 212 has judged that the line symmetric positional relation exists between the graphics T and T', the symmetrizing processing means 22 modifies the characteristic quantities such as the coordinates of the vertexes t1, t2, t3, t'1, t'2 and t'3 stored in the graphic data storage area 31 and updates the content of the characteristic quantities within the graphic data storage area 31.

As set forth hereinabove, according to the present invention, it is possible to modify the graphics promptly so as to stand in the line symmetric positional relation by a simple input operation.

Second Embodiment

Figure 6:
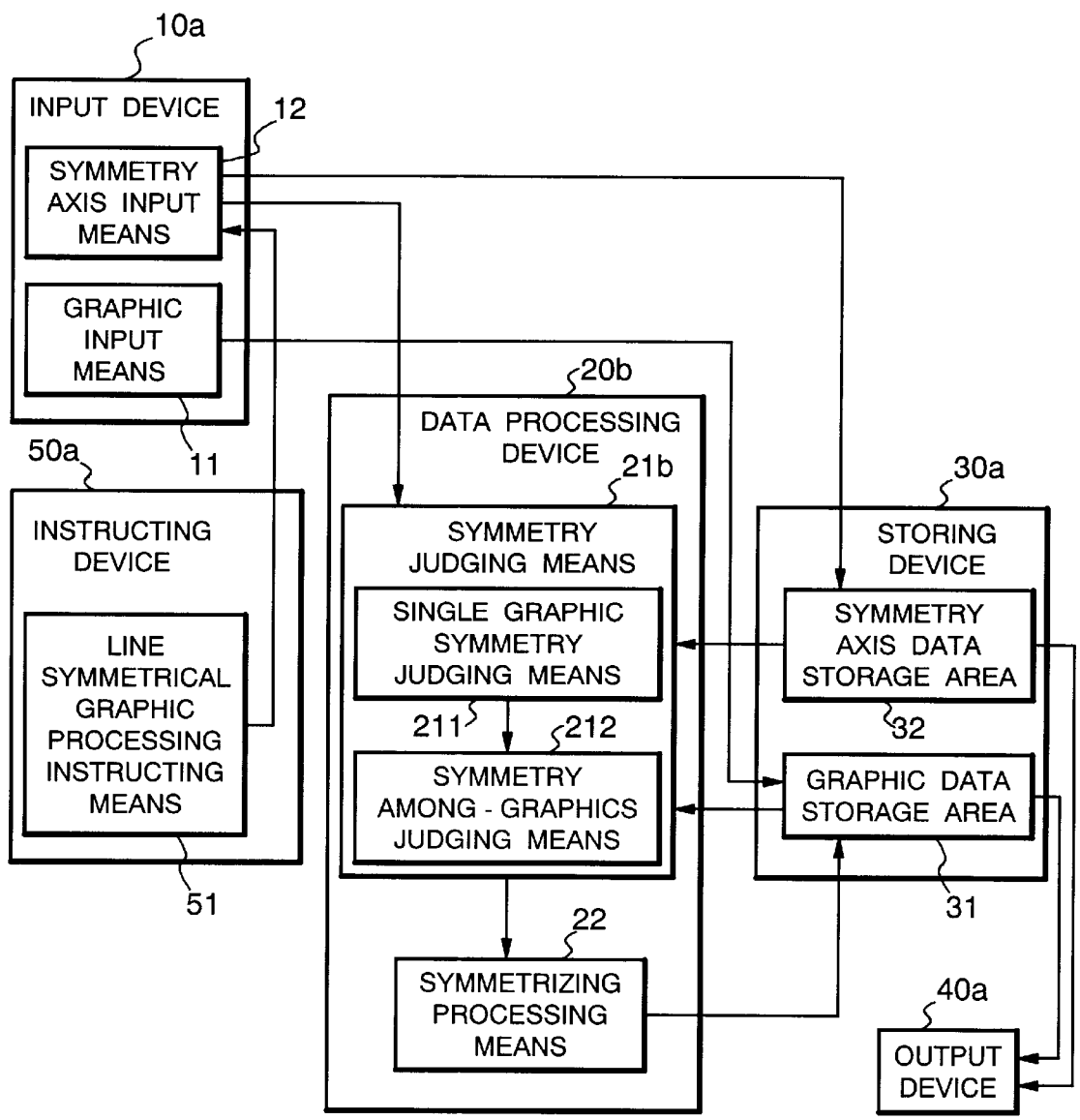
FIG. 6 is a block diagram showing the constitution of a line symmetrical graphic arrangement device of a second embodiment according to the present invention.
Figure 7:
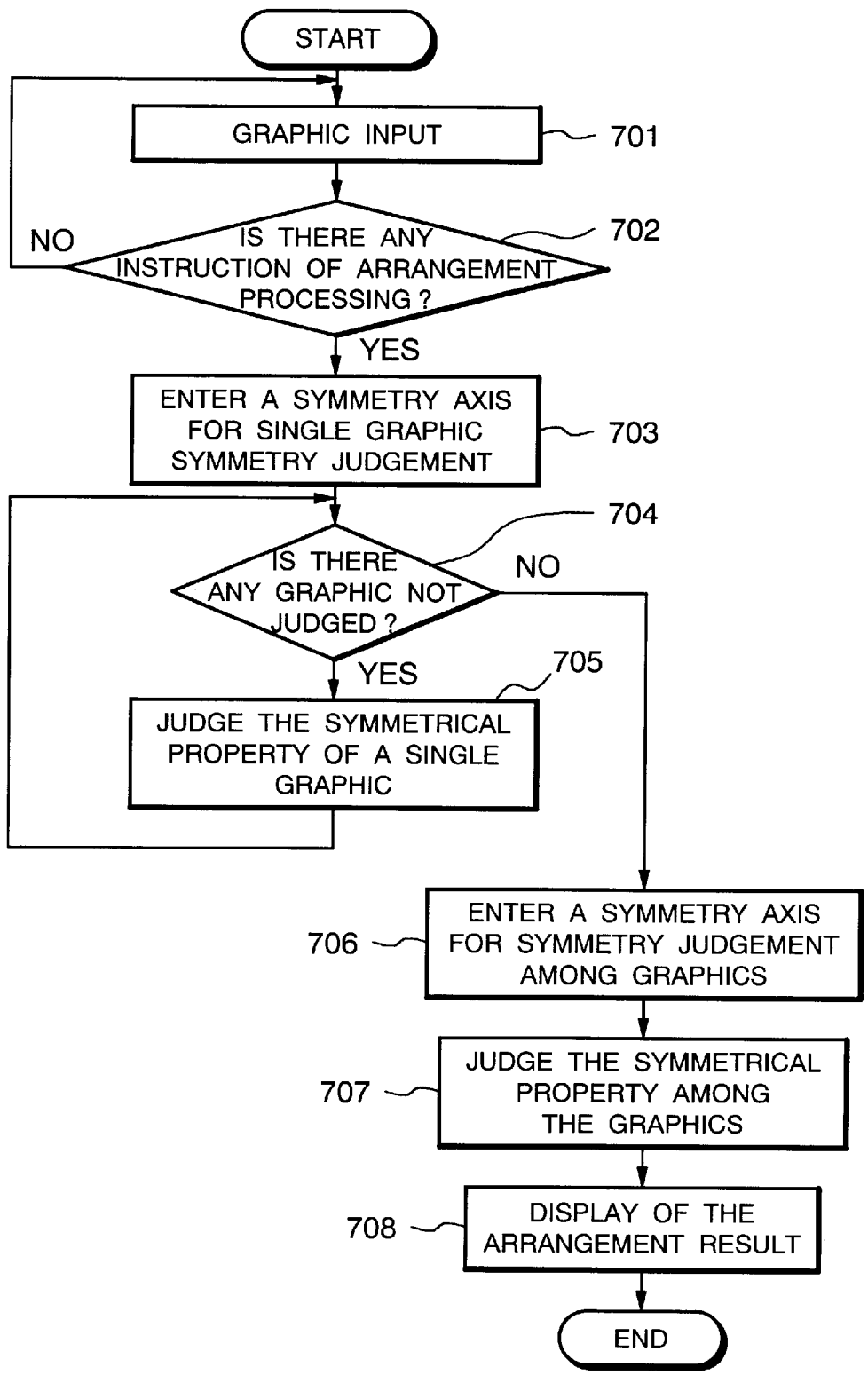
FIG. 7 is a flow chart showing an operation of the second embodiment.
Figure 8A:
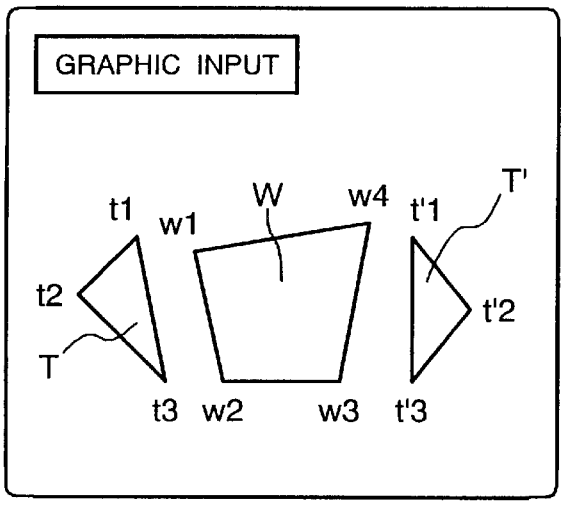
FIG. 8 is a view for use in describing the processing manner according to the second embodiment.
Figure 8B:
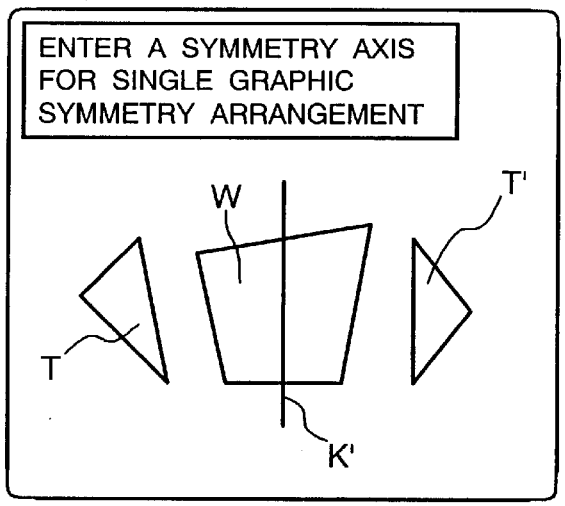
Figure 8C:
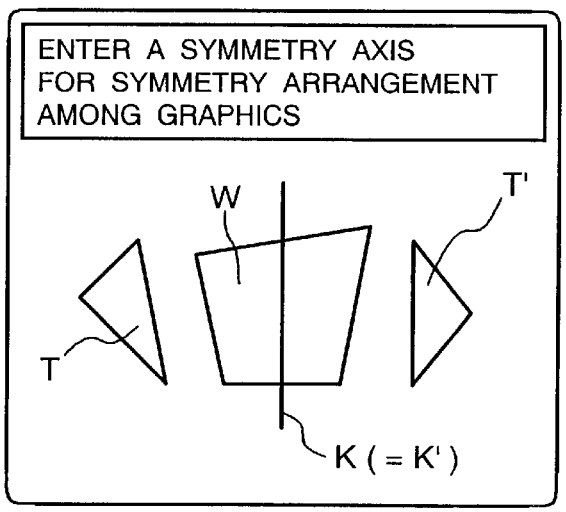
Figure 8D:
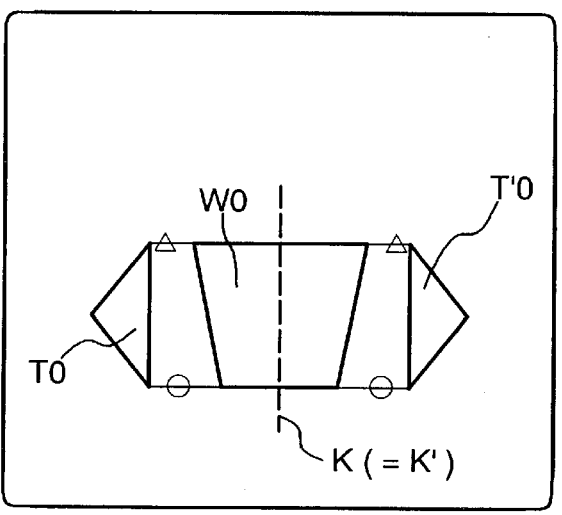
Figure 9:
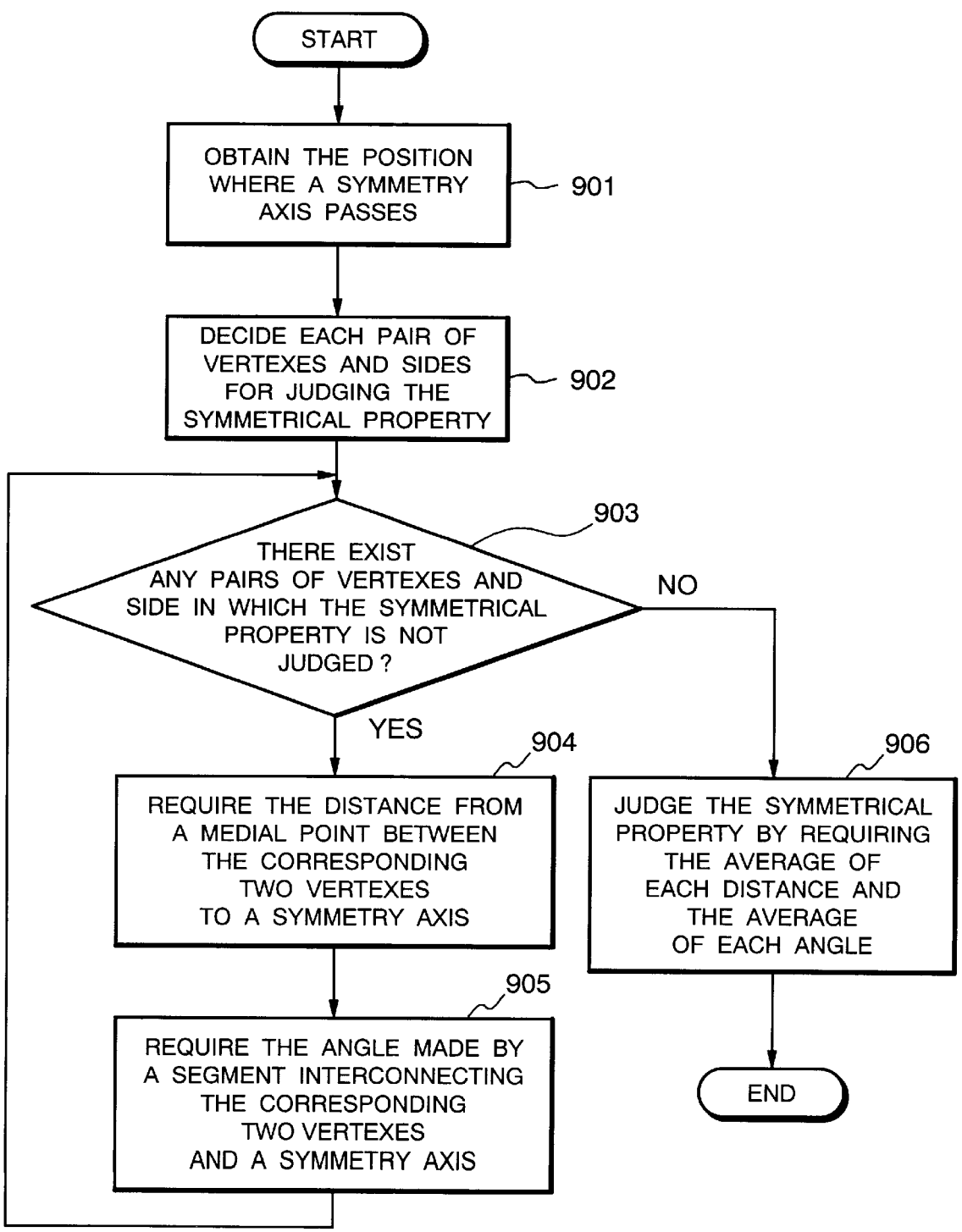
FIG. 9 is a flow chart showing an operation of a single graphic symmetry judging means according to the second embodiment.
Figure 10:
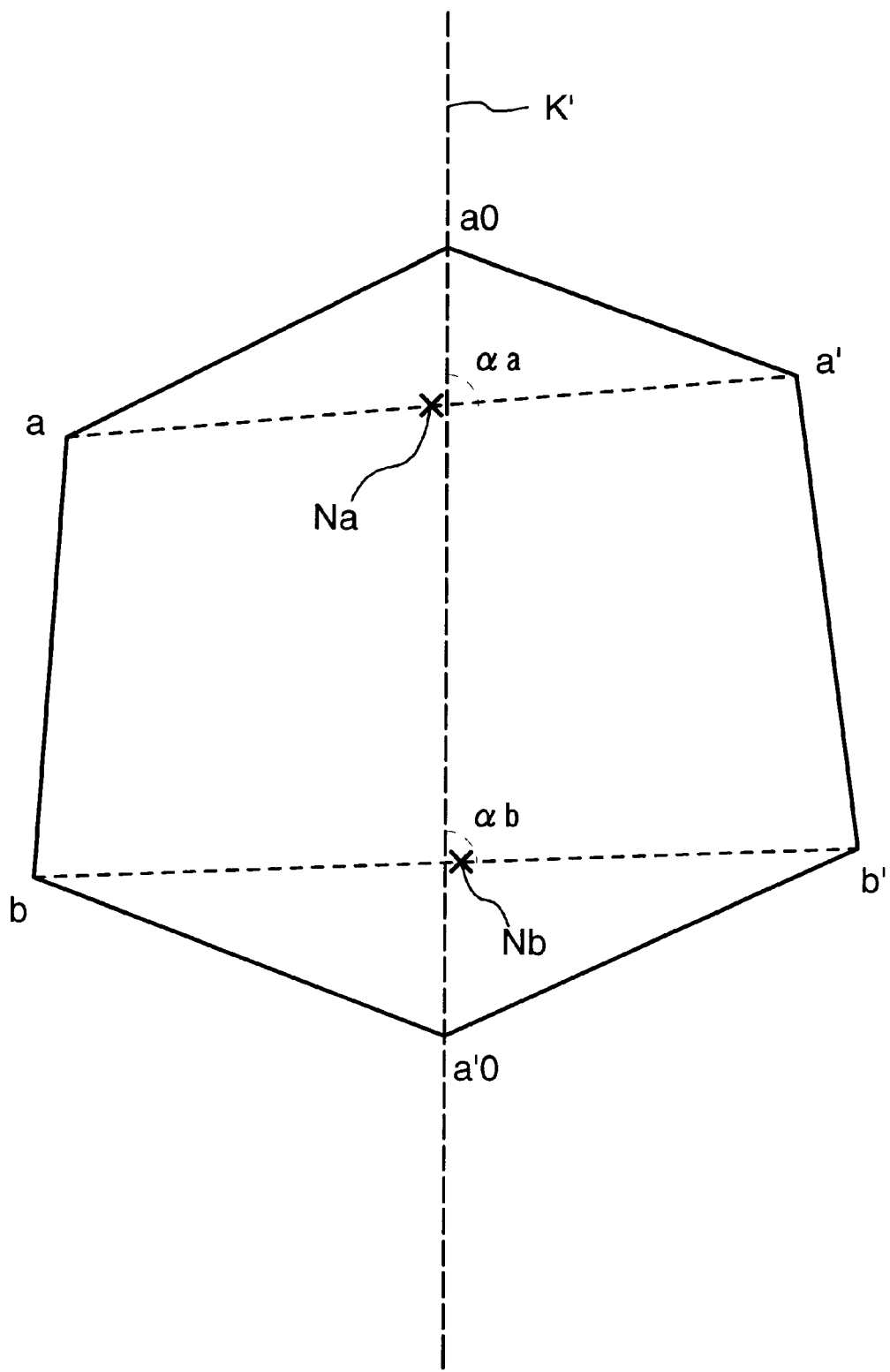
FIG. 10 is a view for use in describing the processing manner according to the single graphic symmetry judging means of the second embodiment.

FIG. 6 is a block diagram showing the constitution of a line symmetrical graphic arrangement device of a second embodiment according to the present invention; FIG. 7 is a flow chart showing an operation of the same device; FIG. 8 is a view for use in describing a processing manner according to the same device; FIG. 9 is a flow chart showing the further detailed operation of the same device; FIG. 10 is a view for use in describing the further detailed processing manner according to the same device.

When an input graphic has a generally line symmetrical shape with respect to a symmetry axis, the second embodiment as shown in FIGS. 6 to 10 is a line symmetrical graphic arrangement device which arranges the input graphic into an accurate line symmetrical shape with respect to the symmetry axis. As for a plurality of input graphics, when some input graphics stand in generally line symmetrical relation with respect to some symmetry axes, the line symmetrical graphic arrangement device according to the second embodiment modifies the positional relation among the graphics so that the input graphics can be in the accurate line symmetrical relation with respect to the symmetry axes, and arranges the graphics themselves into accurate line symmetrical shapes if necessary.

As shown in FIG. 6, the line symmetrical graphic arrangement device according to this embodiment comprises an input device 10a for entering graphic data, a data processing device 20b for performing arrangement of the graphics and modification of the positional relation thereof, a storing device 30a for storing the graphic data, an output device 40a for displaying the graphic created from the graphic data and an instructing device 50a for supplying an instruction command to the data processing device 20b. Of the above components, the input device 10a, the storing device 30a, the output device 40a and the instructing device 50a have the same construction as each of the first embodiment as mentioned above, thereby omitting the description thereof with the same reference numerals attached thereto.

The data processing device 20b is realized by a CPU or the like of a personal computer or a work station run by the program control. The device 20b includes a symmetry judging means 21b for judging line symmetrical relation among entered graphics, and a symmetrizing processing means 22 for arranging the graphics that have been judged to stand in the line symmetrical relation by the symmetry judging means 21b, into line symmetrical shapes with respect to the symmetry axes. The symmetry judging means 21b includes a single graphic symmetry judging means 211 for judging symmetry in the shape of a single graphic and a symmetry among-graphics judging means 212 for judging symmetric positional relation among a plurality of graphics. The symmetrizing processing means 22 in this embodiment is similar to the symmetrizing processing means 22 of the data processing device 20a in the above first embodiment.

An operation of this embodiment will be explained with reference to the flow chart of FIG. 7 and FIG. 8. FIG. 8 shows the case where one graphic W to be arranged into a line symmetrical shape and two graphics T and T' to be modified to stand in the line symmetric positional relation. However, it is needless to say that the number of the graphics to be processed is not restricted to this example.

When the graphics W, T and T' are entered by the graphic input means 11 of the input device 10a (Step 701), all the entered graphics W, T and T' are stored into the graphic data storage area 31 of the storing unit 30a as the graphic data. Characteristic quantities indicating the coordinates of the vertexes W1, W2, W3, and W4 of the graphic W and the vertexes t1, t2, t3, t'1, t'2, and t'3 of the graphics T and T', the angle and length of each side, the type of line and the like, are stored into the graphic data storage area 31 as the graphic data. When the respective graphics W, T and T' are supplied to the data processing device 20b, they are displayed on the screen of the output device 40a as what they are.

On the completion of entering all the graphics W, T and T' to be arranged, an operator gives an instruction to the data processing device 20b so as to perform a line symmetric arrangement by handling the line symmetric arrangement processing instructing means 51 of the instructing device 50 (Step 702), and enters at least one symmetry axis K' for the graphic W, which should be arranged into a line symmetrical shape (symmetry axis for a simple graphic symmetry judgement) by handling the symmetry axis input means 12 of the input device 10a (Step 703). The entered symmetry axis K' is stored into the symmetry axis data storage area 32 of the storing device 30a and displayed on the screen of the output device 40a as illustrated in FIG. 8(B).

When the symmetry axis K' is entered, the simple graphic symmetry judging means 211 recognizes the graphic W having some lines coming across the symmetry axis K' to be a graphic in which the symmetry of the shape should be judged. In the example of FIG. 8, such a graphic objective of judging the symmetry of the shape is only the quadrilateral W. However, when a plurality of symmetry axes are supplied, and there exist the same number of objective graphics of symmetry judgement as the number of supplied symmetry axes, the simple graphic symmetry judging means 211 judges whether each objective graphic has a line symmetrical shape from characteristic quantities of each graphic stored in the graphic data storage area 31 and from the symmetry axis data stored into the symmetry axis data storage area 32 (Steps 704 and 705).

When the symmetry judgement of the shape has been completed as for all the graphics at issue, an operator enters at least one symmetry axis K (symmetry axis for judging symmetric positional relation among graphics) by handling the symmetry axis input means 12 of the input device 10a (Step 706). The entered symmetry axis K is stored into the symmetry axis data storage area 32 of the storing device 30a and displayed on the screen of the output device 40a as illustrated in FIG. 8(C). In this example, the symmetry axis K conforms with the symmetry axis K'. It doesn't matter that they are different from each other. The symmetry among-graphics judging means 212 judges whether the shape of each graphic and the positional relation among graphics are symmetric with respect to the symmetry axis K (Step 707). The graphic W has the symmetrical shape with respect to the symmetry axis K' conforming with the symmetry axis K as mentioned above. Obviously, there is not such a graphic that is in the symmetric positional relation together with the graphic W. Therefore, the graphic W is removed from the graphics that are objects of symmetry judgement in Step 707, where the judgement is performed on the graphics T and T' only.

As the result of judging symmetry in Steps 706 and 707, as for some graphics, if the symmetry exists in the shape of at least one graphic or in the positional relation among the graphics, the symmetrizing processing means 22 modifies the characteristic quantities such as the coordinates of the vertexes w1, w2, w3, and w4 stored in the graphic data storage area 31 or the like so that the simple graphic W may have an accurate symmetrical shape with respect to the symmetry axis K' (=K), and updates the content stored in the graphic data storage area 31. Further the symmetrizing processing means 22 modifies the characteristic quantities such as the coordinates of the vertexes t1, t2, t3, t'1, t'2, and t'3 stored in the graphic data storage area 31 or the like so that the shapes of the graphics T and T' and the positional relation therebetween may become symmetric with respect to the symmetry axis K (=K'), and updates the content stored in the graphic data storage area 31. The graphic W0, which has been arranged into a line symmetrical shape and the graphics T0 and T'0 that have been modified to have line symmetrical shapes respectively and to be in the line symmetric positional relation are displayed on the output device 40a as illustrated in FIG. 8(D) (Step 708).

A procedure of the operation of the simple graphic symmetry judging means 211 will be further described in detailed with reference to the flow chart of FIG. 9 and FIG. 10.

The simple graphic symmetry judging means 211 acquires the intersection of the symmetry axis for the simple graphic symmetry judgement K' and the graphic Wa, which is an object of arrangement, and judges which vertexes or medial points of lines pass the symmetry axis K' after arrangement (Step 901). Starting from one vertex (or medial point) toward another opposite vertex (or medial point) where the symmetry axis K' passes, the pairs of the vertexes; a, a', b, b' located on the both sides of the symmetry axis K' are clockwisely or counterclockwisely decided one after another as illustrated in FIG. 10. At this time, each vertex in the clockwise order of n (n=1, 2, . . . ) and each vertex in the counterclockwise order of n (n=1, 2, . . . ) are made a pair (Step 902). In this example, (a, a') is the first pair of vertexes and (b, b') is the second pair of vertexes.

The simple graphic symmetry judging means 211 acquires the distance from the symmetry axis K' to the medial point Na between the two vertexes, which are the first pair of vertexes (Step 904), and calculates the angle α a made by the symmetry axis K' and the segment interconnecting the vertexes a and a' (Step 905). The maximum value of the angle α a is 90°.

After the completion of the process of Steps 904 and 905 for all the pairs of the vertexes, the simple graphic symmetry judging means 211 acquires the average value of each distance between the symmetry axis K' and the respective medial points Na and Nb, and the average value of the angle α a made by the symmetry axis K' and the segment interconnecting the two vertexes (a, a') and the angle α b made by the symmetry axis K' and the segment interconnecting the two vertexes (b, b'). When the average value of each distance between each medial point and the symmetry axis is a predetermined threshold level close to 0, or below and the average value of each angle made by each segment interconnecting two vertexes and the symmetry axis is a predetermined threshold level close to 90°, or above, the graphic W is judged to have a line symmetrical shape with respect to the symmetry axis K' (Steps 903 and 906).

When the simple graphic symmetry judging means 211 completes the judgement of symmetry as for all the graphics at issue, the symmetry among-graphics judging means 212 starts the process of judging symmetry about the positional relation between the graphics T and T' in the same way as that of the symmetry among-graphics judging means 212 according to the first embodiment mentioned above.

When the graphic W is judged to have a line symmetrical shape with respect to the symmetry axis K' by the simple graphic symmetry judging means 211 and the shapes of the graphics T and T' and the positional relation therebetween are judged to be line symmetric with respect to the symmetry axis K, the symmetrizing processing means 22 performs the following operation. The means 21 modifies the characteristic quantities such as the coordinates of the vertexes w1, w2, w3 and w4, or the like stored in the graphic data storage area 31 so that the graphic W may become an accurate line symmetrical shape with respect to the symmetry axis, and updates the content within the graphic data storage area 31 to the modified characteristic quantities. Further, the means 21 modifies the characteristic quantities such as the coordinates of the vertexes t1, t2, t3, t'1, t'2 and t'3, or the like stored in the graphic data storage area 31 so that the shapes of the graphics T and T' and the positional relation thereof may be accurately line symmetric with respect to the symmetry axis K, and updates the content within the graphic data storage area 31 to the modified characteristic quantities.

As set forth hereinabove, the present embodiment is capable of arranging graphics into accurate line symmetrical shapes promptly with a simple input operation and modifying the graphics to stand in the accurate line symmetric positional relation promptly.

Third Embodiment

Figure 11:
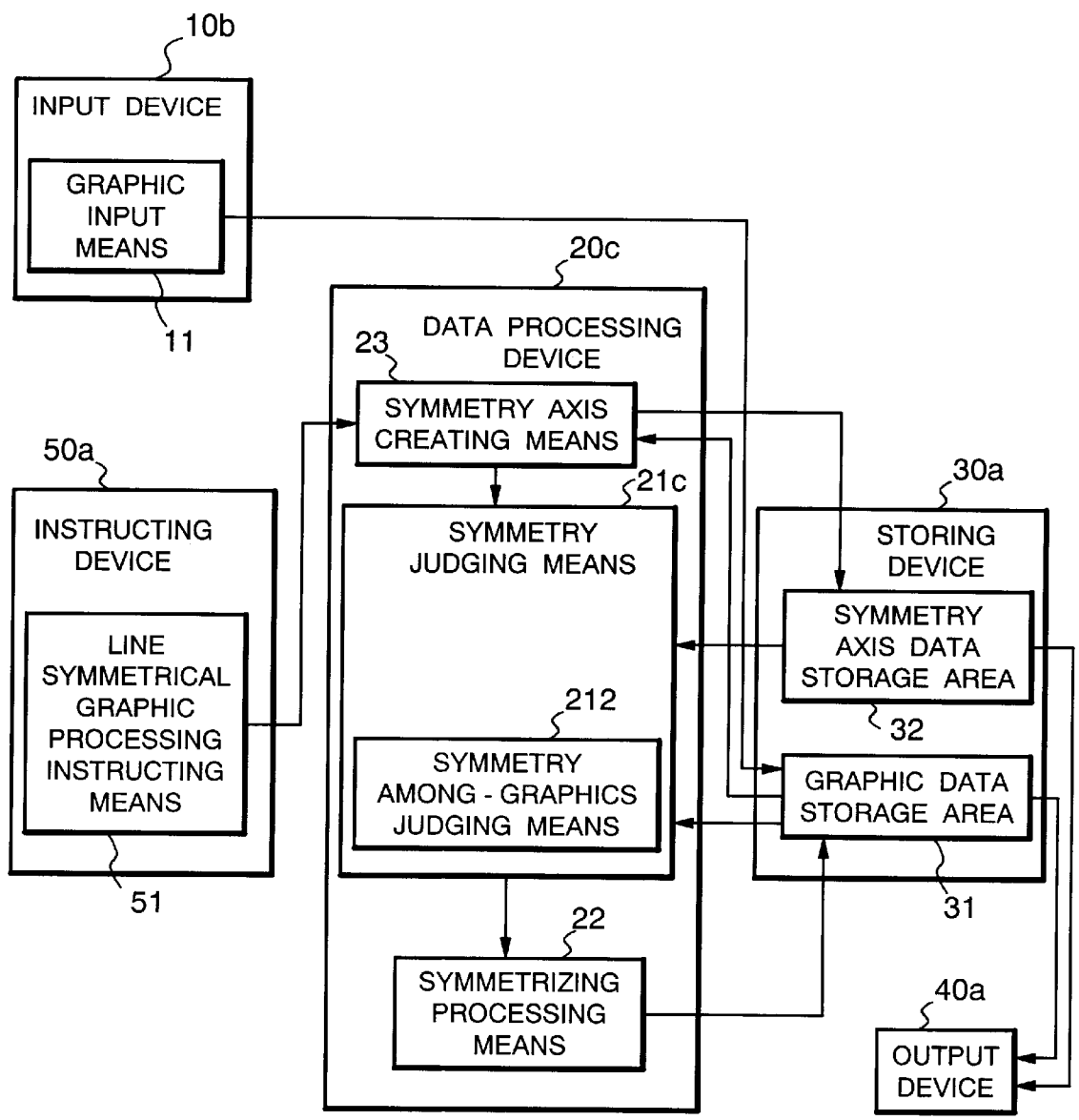
FIG. 11 is a block diagram showing the constitution of a line symmetrical graphic arrangement device of a third embodiment according to the present invention.
Figure 12:
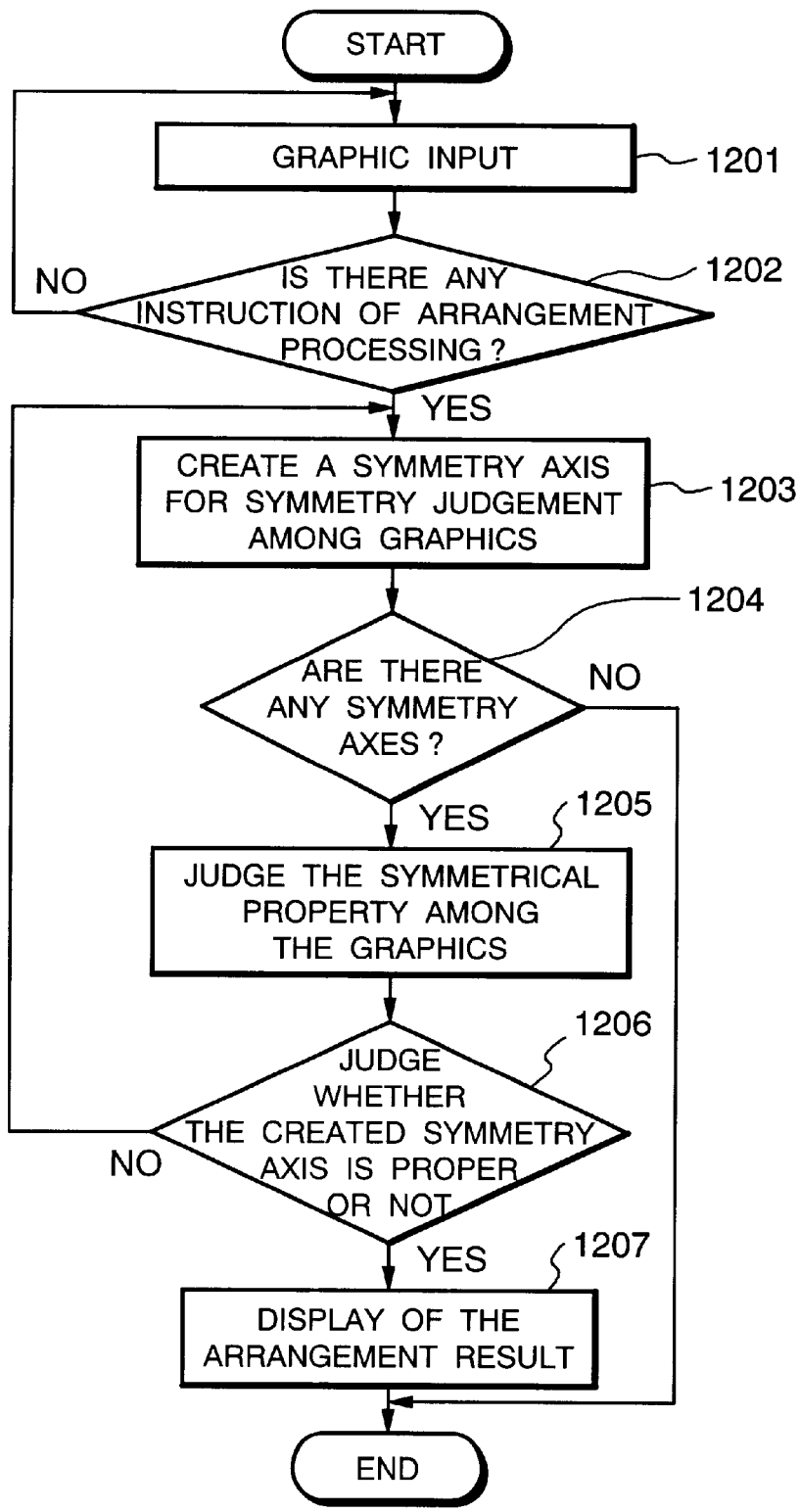
FIG. 12 is a flow chart showing an operation of the third embodiment.

FIG. 11 is a block diagram showing the constitution of a line symmetrical graphic arrangement device of a third embodiment according to the present invention; FIG. 12 is a flow chart showing an operation of the same device; FIG. 13 is a view for use in describing the processing manner of the same device.

The third embodiment shown in FIGS. 11 to 13 is a line symmetrical graphic arrangement device that modifies the positional relation among graphics and arranges the graphics themselves if necessary so that the input graphics can be symmetrized accurately with respect to the symmetry axis, when a plurality of input graphics are substantially in the symmetrical relation with respect to a symmetry axis.

As shown in FIG. 11, the line symmetrical graphic arrangement device according to this embodiment comprises an input device 10b for entering graphic data, a data processing device 20c for performing arrangement of the graphics and modification of the position relation thereof, a storing device 30a for storing the graphic data, an output device 40a for displaying the graphic created from the graphic data and an instructing device 50a for supplying an instruction command to the data processing device 20c. Of the above components, the storing device 30a, the output device 40a and the instructing device 50a have the same construction as each of the first embodiment as mentioned above, thereby omitting the description thereof with the same reference numerals attached thereto.

The input device 10b is realized by various input devices such as a keyboard, a mouse, a scanner, a light pen, a tablet or the like. The device 10a includes a graphic input means 11 only and excludes a symmetry axis input means 12, differently from the input device 10a of the first and second embodiments. Therefore, the entry of only the input graphics is performed by the input device 10a.

The data processing device 20c is realized by a CPU or the like of a personal computer or a work station run by the program control. The device 20c includes a symmetry judging means 21c and a symmetrizing processing means 22, and further includes a symmetry axis creating means 23 for creating symmetry axes for use in judging line symmetry of graphics and arranging the graphics into line symmetric shapes. The symmetry judging means 21c includes a symmetry among-graphics judging means 212 as a main part, similarly to the symmetry judging means 21a of the first embodiment illustrated in FIG. 1.

An operation of this embodiment will be explained with reference to the flow chart of FIG. 12 and FIG. 13. Though FIG. 13 shows the case where the two graphics Ta and Ta' are modified to be in the line symmetric positional relation, it is needless to say that the number of the graphics to be processed is not restricted to two.

Figure 13A:
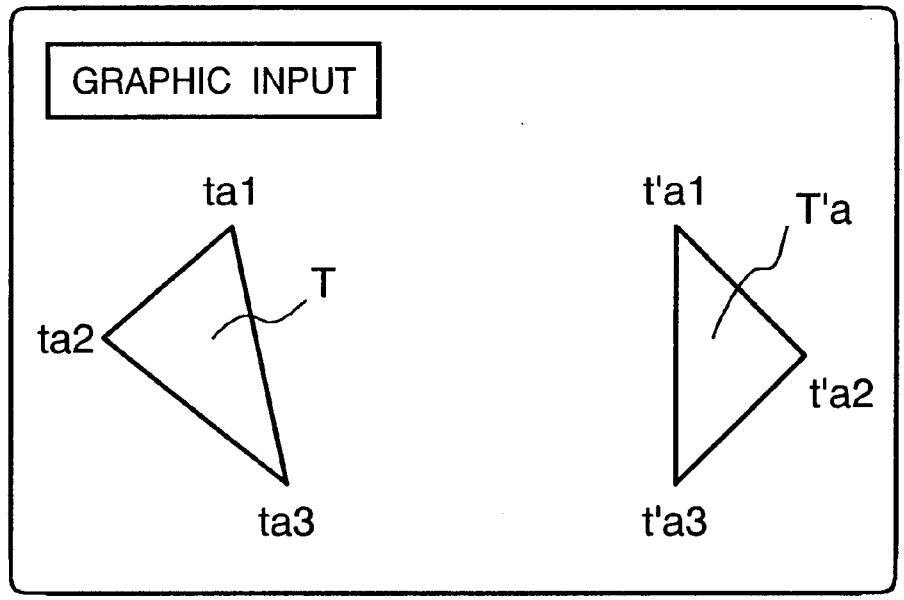
FIG. 13 is a view for use in describing the processing manner according to the third embodiment.

When the graphics Ta and Ta' are entered by the graphic input means 11 of the input device 10b (Step 1201), all the entered graphics Ta and Ta' are stored into the graphic data storage area 31 of the storing device 30a. Characteristic quantities indicating the coordinates of vertexes ta1, ta2, ta3, ta'1, ta'2, and ta'3 of the graphics Ta and Ta', the angle and length of each side, the type of line, are stored as the graphic data. When the graphics Ta and Ta' are entered into the data processing device 20a, as illustrated in FIG. 13(A), the graphics appear on the screen of the output device 40a as what they are.

On the completion of entering the whole graphics T and T' to be arranged, an operator gives an instruction to the data processing device 20c so as to perform a line symmetric arrangement by the use of the line symmetric arrangement processing instructing means 51 (Step 1202). Then, the symmetry axis creating means 23 operates so as to create one candidate axis Ka for a symmetry axis (symmetry axis for judging symmetry among graphics), which can make the graphics Ta and Ta' in the line symmetric positional relation on the basis of the positional relation of the entered graphics Ta and Ta' (Step 1203). For example, with regard to a pair of graphics electively combined, the symmetry axis creating means 23 acquires each vertical bisector of a line connecting each of the corresponding characteristic quantities. When all the required vertical bisectors conform with each other or stand near, the vertical bisector is decided to be a candidate symmetry axis Ka. The information on the candidate symmetry axis obtained thus is stored in the symmetry axis data storage area 32.

If a candidate symmetry axis Ka can't be created, it means that the entered graphics are not located in the symmetrical relation with respect to any symmetry axis (Steps 1203 and 1204), so that the arrangement processing is stopped.

When a candidate symmetry axis Ka has been created, the symmetry among-graphics judging means 212 judges whether the entered graphics Ta and Ta' have line symmetrical shapes and positional relation with respect to the candidate symmetry axis Ka by the same operation as that of the symmetry among-graphics judging means 212 according to the above mentioned first embodiment (referred to FIG. 4) (Steps 1205 and 1206). When no symmetry is found as the result of the above judgement, the processing is returned to Step 1203, where the symmetry axis creating means 23 creates another candidate symmetry axis (Step 1206).

Figure 13B:
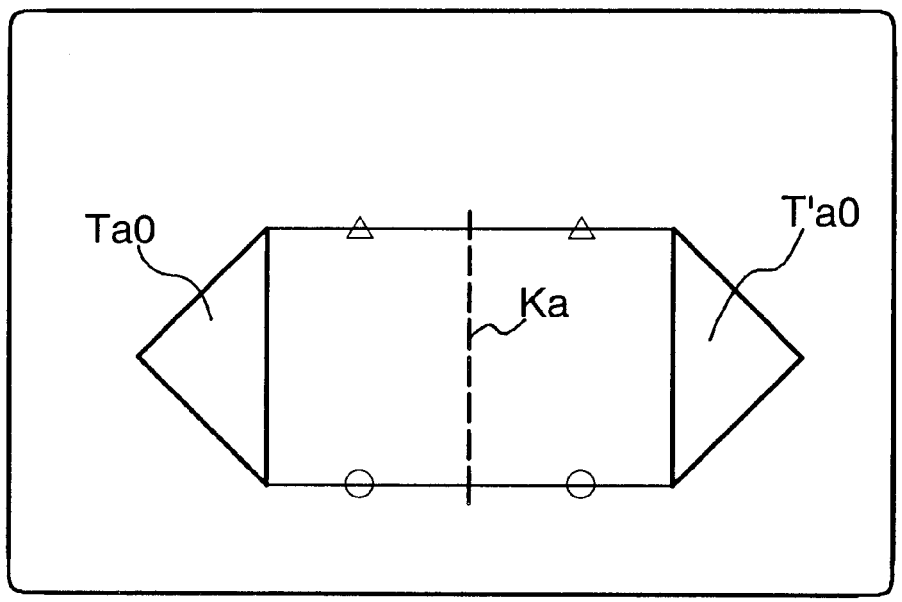

While, when the symmetry is found in the graphics Ta and Ta', the symmetrizing processing means 22 modifies the characteristic quantities such as the coordinates of the vertexes ta1, ta2, ta3, ta'1, ta'2 and ta'3 stored in the graphic data storage area 31, so that the shapes of the graphics Ta, Ta' and the positional relation therebetween may be accurately line symmetric with respect to the symmetry axis Ka and updates the content within the graphic data storage area 31. The graphics Ta0 and Ta'0 arranged into line symmetrical shapes and line symmetric positional relation according to the updated characteristic quantities, are displayed on the output device 40a as illustrated in FIG. 13(B) (Step 1207).

As set forth hereinabove, the line symmetrical graphic arrangement device according to this embodiment is capable of reducing an operator's labor extremely, by automatically creating a symmetry axis and modifying the positional relation between the graphics with respect to the created symmetry axis.

Fourth Embodiment

Figure 14:
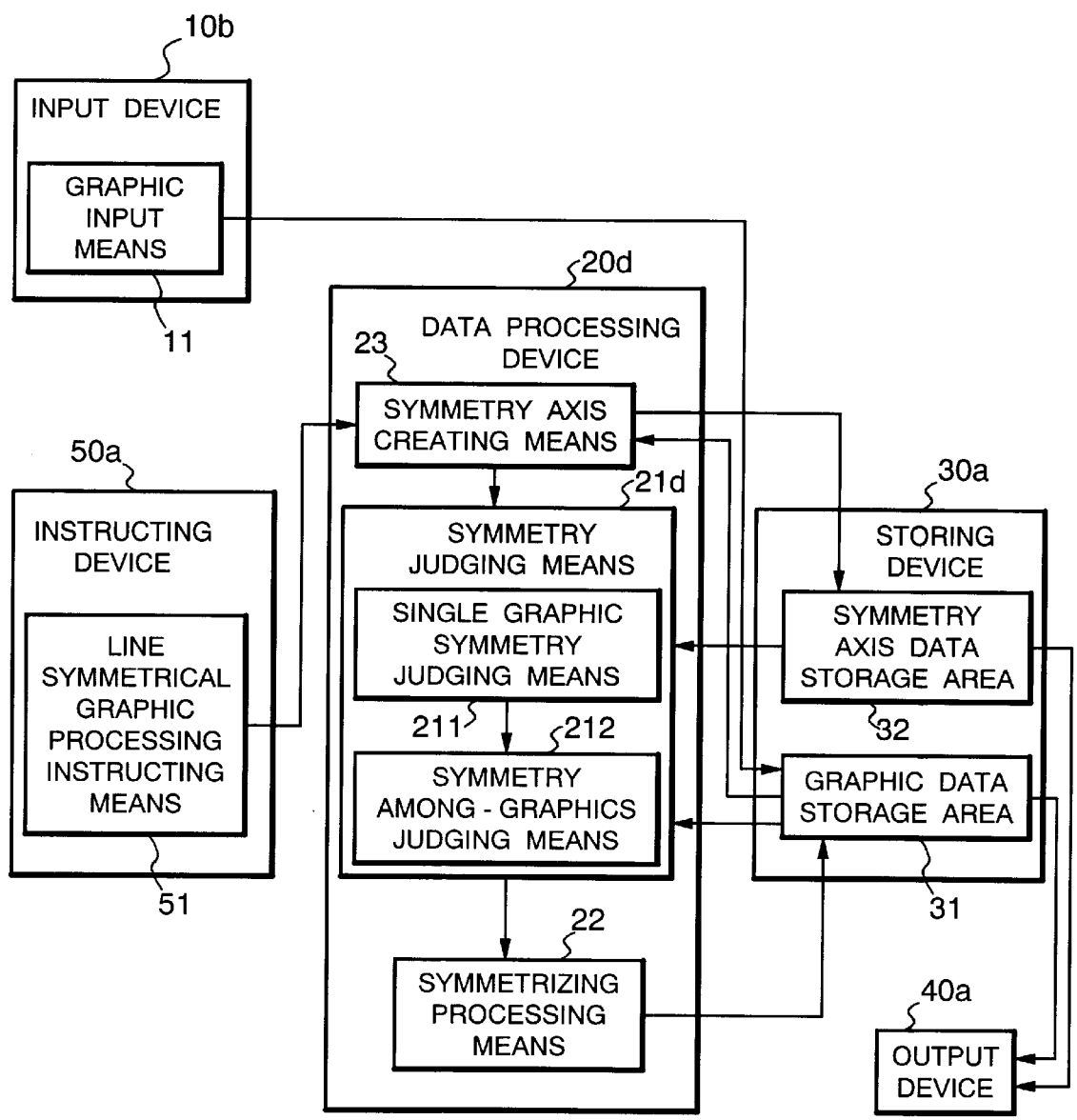
FIG. 14 is a block diagram showing the constitution of a line symmetrical graphic arrangement device of a fourth embodiment according to the present invention.
Figure 15:
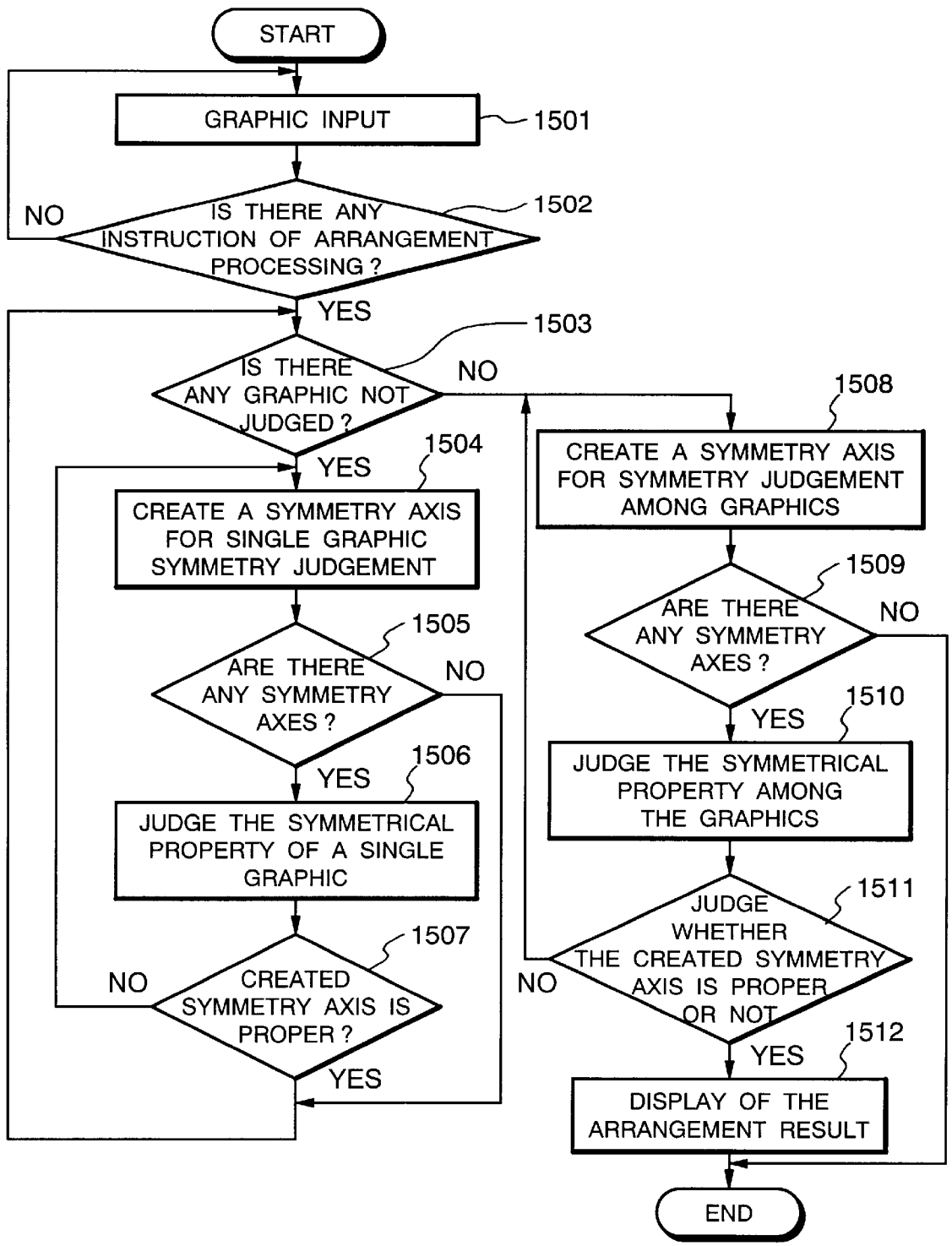
FIG. 15 is a flow chart showing an operation of the fourth embodiment.
Figure 16A:
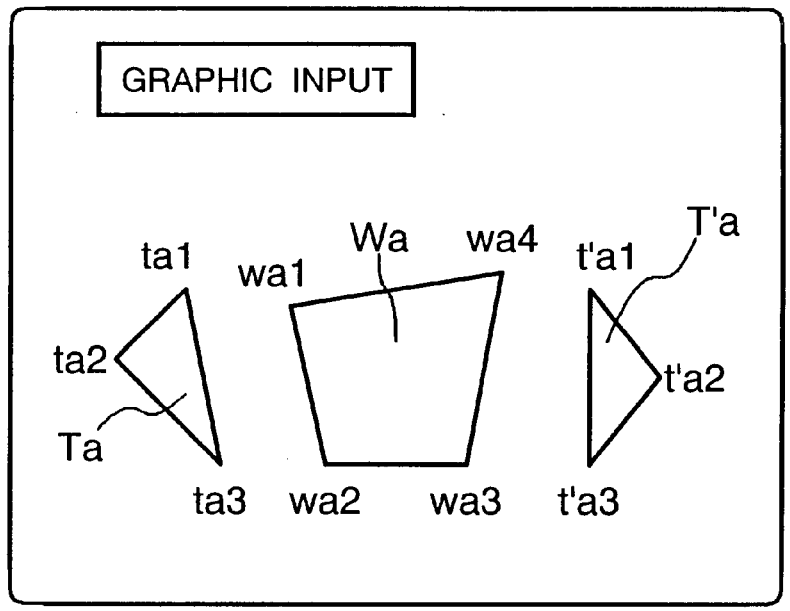
FIG. 16 is a view for use in describing the processing manner according to the fourth embodiment.
Figure 16B:
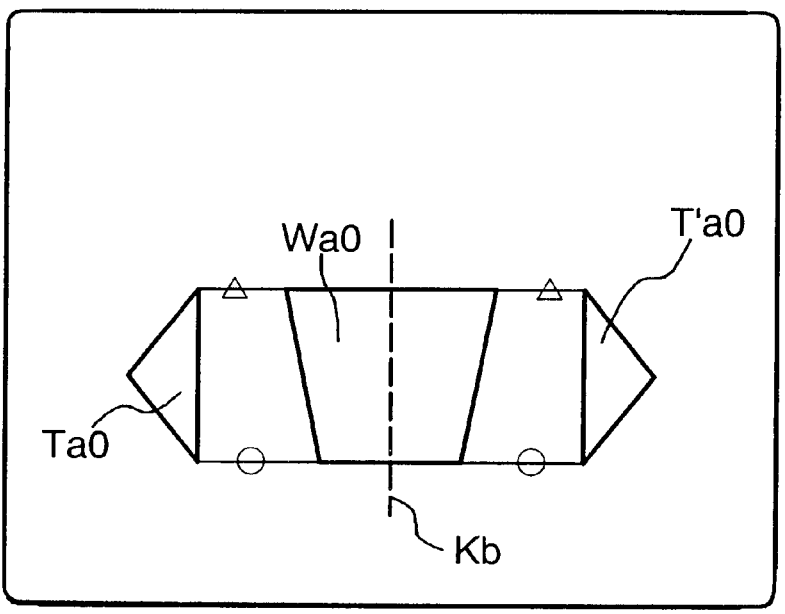

FIG. 14 is a block diagram showing the construction of a line symmetrical graphic arrangement device according to a fourth embodiment of the present invention; FIG. 15 is a flow chart showing an operation of the same device; FIG. 16 is a view for use in describing a processing manner according to the same device.

The fourth embodiment illustrated in FIGS. 14 to 16 is the line symmetrical graphic arrangement device that arranges an input graphic to have an accurate line symmetrical shape with respect to a predetermined symmetry axis when the input graphic has a substantially line symmetrical shape with respect to the predetermined axis of symmetry. As for a plurality of input graphics, when certain graphics are located in the substantially symmetrical relation with respect to a predetermined symmetry axis, this device modifies the positional relation among the graphics so that the correctly line symmetric positional relation with respect to the predetermined symmetry axis may be established among them, and arranges the shapes of the graphics themselves if necessary.

As shown in FIG. 14, the line symmetrical graphic arrangement device of this embodiment comprises an input device 10b for entering graphic data, a data processing device 20d for performing the arrangement of the graphics and modification of the positional relation among the graphics, a storing device 30a for storing the graphic data, an output device 40a for displaying the graphics formed from the graphic data, and an instructing device 50a for supplying an instruction command to the data processing device 20d. Of the above components, the storing device 30a, the output device 40a and the instructing device 50a have the same structure as those of the first embodiment, and the input device 10b has the same structure as that of the above-mentioned third embodiment. Accordingly, the description thereof will be omitted here with the same reference numerals attached thereto.

The data processing device 20d is realized by a CPU or the like of a personal computer and a work station run by program control. The data processing device 20d includes a symmetry judging means 21d for judging line symmetry among the input graphics, a symmetrizing processing means 22 for arranging a graphics that have been judged to be line symmetric by the symmetry judging means 21d, into a line symmetrical shape with respect to a symmetry axis, and a symmetry axis creating means 23. The symmetry judging means 21d includes a single graphic symmetry judging means 211 for judging symmetry of the shape in a single graphic, and a symmetry among-graphics judging means 212 for judging symmetry of the positional relation among a plurality of graphics. The syrnietrizing processing means 22 is similar to that of the data processing device 20a of the above-mentioned first embodiment. Also, the symmetry axis creating means 23 is similar to the symmetrizing processing means 23 of the data processing device 20c of the above-mentioned third embodiment.

Next, the operation of the line symmetrical graphic arrangement device according to the fourth embodiment will be described with reference to the flow chart of FIG. 15 and FIG. 16. Though FIG. 16 shows the case where the shape of the graphic Wa is arranged to be line symmetric and the positional relation between the two graphics Ta and Ta' is modified to be line symmetric, it is needless to say that the number of graphics to be processed is not limited to that exemplified in the drawing.

At first, the graphics Wa, Ta and Ta' are entered by the graphic input means 11 of the input device 10b (Step 1501), and the entered graphics Wa, Ta and Ta' are all stored in the graphic data storage area 31 of the storing device 30a. Graphic characteristic quantities such as the coordinates of the vertexes wa1, wa2, wa3 and wa4 of the graphic Wa, the coordinates of the vertexes ta1, ta2, ta3, ta'1, ta'2 and ta'3 of the graphics Ta and Ta', the angle and length of each side of the graphics, and the type of lines of the graphics are stored as graphic data in the graphic data storage area 31. When the graphics Wa, Ta and Ta' are entered in the data processing device 20d, as shown in FIG. 16(A), they are displayed on the screen of the output device 40a as they are.

When all the graphics Wa, Ta and Ta' to be arranged have been entered, the operator operates a line symmetrical arrangement processing instructing means 51 to issue an instruction to the data processing device 20d so as to perform line symmetrical arrangement (Step 1502). Then, the symmetry axis creating means 23 works to create the candidate symmetry axis for one input graphic selected optionally as a target graphic among the input graphics Wa, Ta and Ta. In the example of FIG. 16(A), the graphic Wa is regarded as a target for creating the the candidate symmetry axis. As it will be described below, the process of Steps 1504 to 1507 is executed for all input graphics in order.

On the basis of the characteristic quantities such as the vertexes and sides of the target graphic Wa stored in the graphic data storage area 31, the symmetry axis creating means 23 acquires combinations of the vertexes or combinations of medial points of the sides of the graphic Wa, presumes some straight lines that pass through the combinations of the vertexes or combinations of medial points of the sides of the graphic, selects a straight line that may be a symmetry axis among the presumed straight lines, and determines it as a candidate for a symmetry axis Kb (a symmetry axis for judging symmetry of a single graphic) (Step 1504). Information on the created candidate for a symmetry axis Kb is stored in a symmetry axis data storage area 32.

If the candidate symmetry axis Kb cannot be created, it means that the target graphic Wa does not have a line symmetrical shape, so that the following processing of symmetry judgement is not carried out (Step 1505).

If the candidate symmetry axis Kb can be created, the single graphic symmetry judging means 211 judges whether the target graphic Wa has a line symmetrical shape or not, depending on the characteristic quantities of the graphic Wa stored in the graphic data storage area 31 and the information of the candidate symmetry axis Kb stored in the symmetry axis data storage area 32 (Step 1506).

When it is judged by the single graphic symmetry judging means 211 that the graphic Wa has a line symmetrical shape. That is, when the created symmetry axis Kb is judged to be proper, the symmetrizing processing means 22 modifies the characteristic quantities such as the coordinates of the vertexes wa1, wa2, wa3 and wa4 and the like stored in the graphic data storage area 31 so that the single graphic Wa may be correctly line symmetric with respect to the symmetry axis Kb, and updates the content within the graphic data storage area 31. Then, on the basis of the updated characteristic quantities, a graphic Wa0 obtained by arranging the graphic Wa to have a line symmetrical shape is displayed on the output device 40a.

On the other hand, when it is judged by the single graphic symmetry judging means 211 that the graphic Wa does not have a line symmetrical shape, the operation is returned to the process of Step 1504, and another candidate symmetry axis is searched and created (Step 1507).

The above-mentioned process of Steps 1504 to 1507 is executed for all input graphics in order. In the example of FIG. 16, the candidate symmetry axis is created for the input graphics Ta and Ta', and it is examined whether the candidate symmetry axis is appropriate or not (Steps 1503 to 1507).

When the arrangement processing for all the graphics judged to be line symmetric by the single graphic symmetry judging means 211, has been completed, the symmetry axis creating means 23 starts again and, on the basis of the positional relation between the input graphics Ta and Ta', creates a candidate for a symmetry axis Kb (a symmetry axis for judging symmetry between graphics), which can make these graphics Ta and Ta' in the line symmetric positional relation (Step 1508). In this example, although the symmetry axis Ka and Kb conform with each other, they may be different from each other.

Subsequently, the symmetry among-graphics judging means 212 judges whether or not the input graphics Wa, Ta and Ta' have line symmetrical shapes and stand in the line symmetric positional relation with respect to the candidate symmetry axis Kb, by the operation similar to that (see FIG. 4) of the symmetry among-graphics judging means 212 of the above-mentioned first embodiment (Steps 1510 and 1511). When it is judged that there exists no symmetrical property, the operation is returned to the process of Step 1508, where the symmetry axis creating means 23 starts to create another candidate symmetry axis (Step 1511). In this example, since there exists no graphic in the line symmetrical positional relation together with the graphic Wa, a candidate symmetry axis corresponding to the graphic Wa is not created.

On the other hand, when it is judged that the graphics Ta and Ta' have the line symmetrical shapes and line symmetric positional relationship therebetween, the symmetrizing processing means 22 modifies the characteristic quantities such as the coordinates of the vertexes ta1, ta2, ta3, ta'1, ta'2 and ta'3 and the like stored in the graphic data storage area 31 so that the shapes of the graphics Ta and Ta' and the positional relation therebetween may be line symmetric with respect to the symmetry axis Kb. The symmetrizing processing means 22 also updates the content within the graphic data storage area 31. Then, on the basis of the updated characteristic quantities, graphics Ta0 and Ta'0 obtained by arranging the graphics Ta and Ta' to have the line symmetrical relation and line symmetrical shapes are displayed on the output device 40a (Step 1512).

As set forth hereinabove, the line symmetrical graphic arrangement device according to the fourth embodiment is capable of reducing the labor of an operator, by automatically creating a symmetry axis, arranging the graphics to be line symmetrical shapes and modifying the graphics to be in the line symmetric positional relation depending on the created symmetry axis.

Fifth Embodiment

Figure 17:
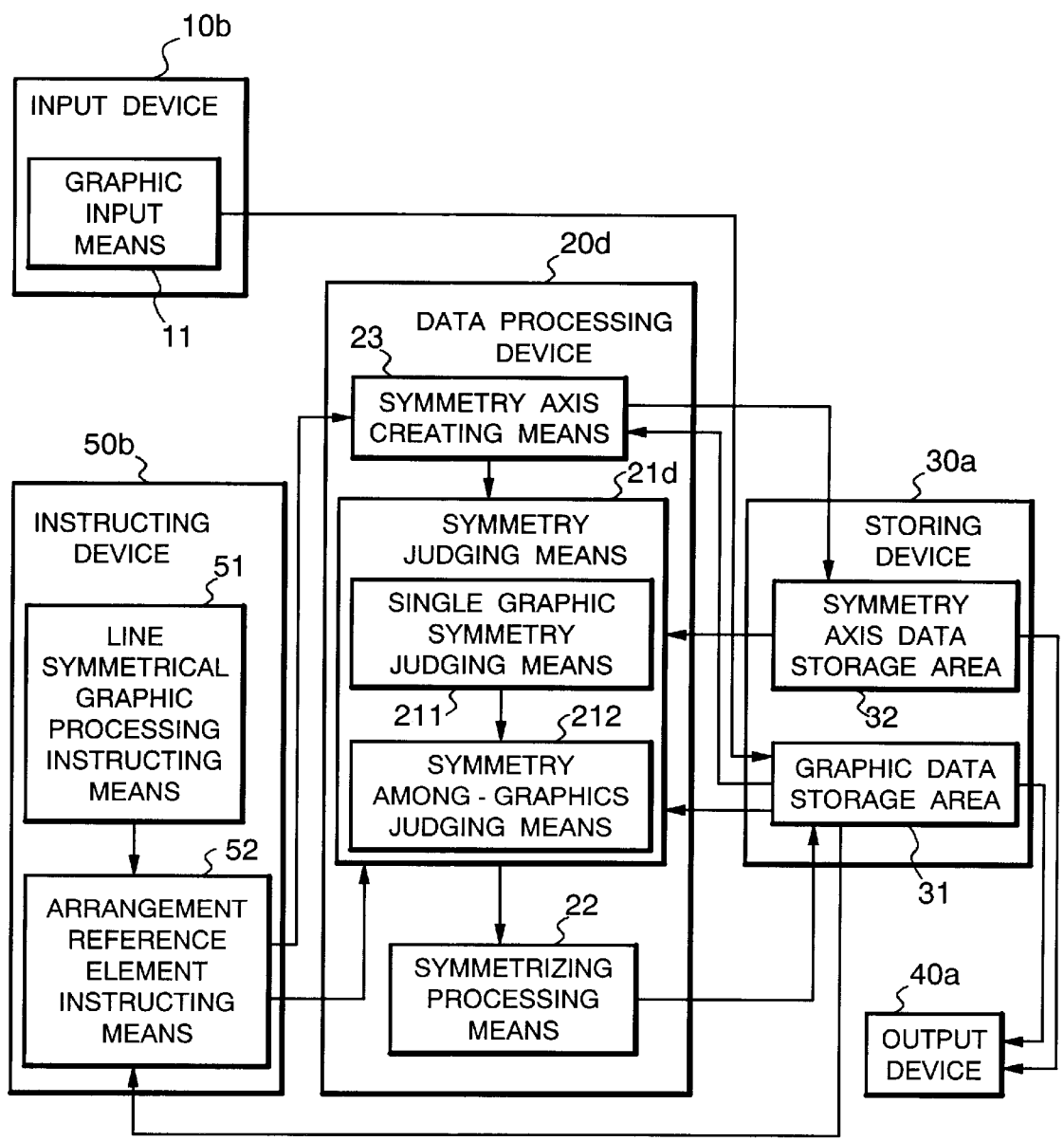
FIG. 17 is a block diagram showing the constitution of a line symmetrical graphic arrangement device of a fifth embodiment according to the present invention.
Figure 18:
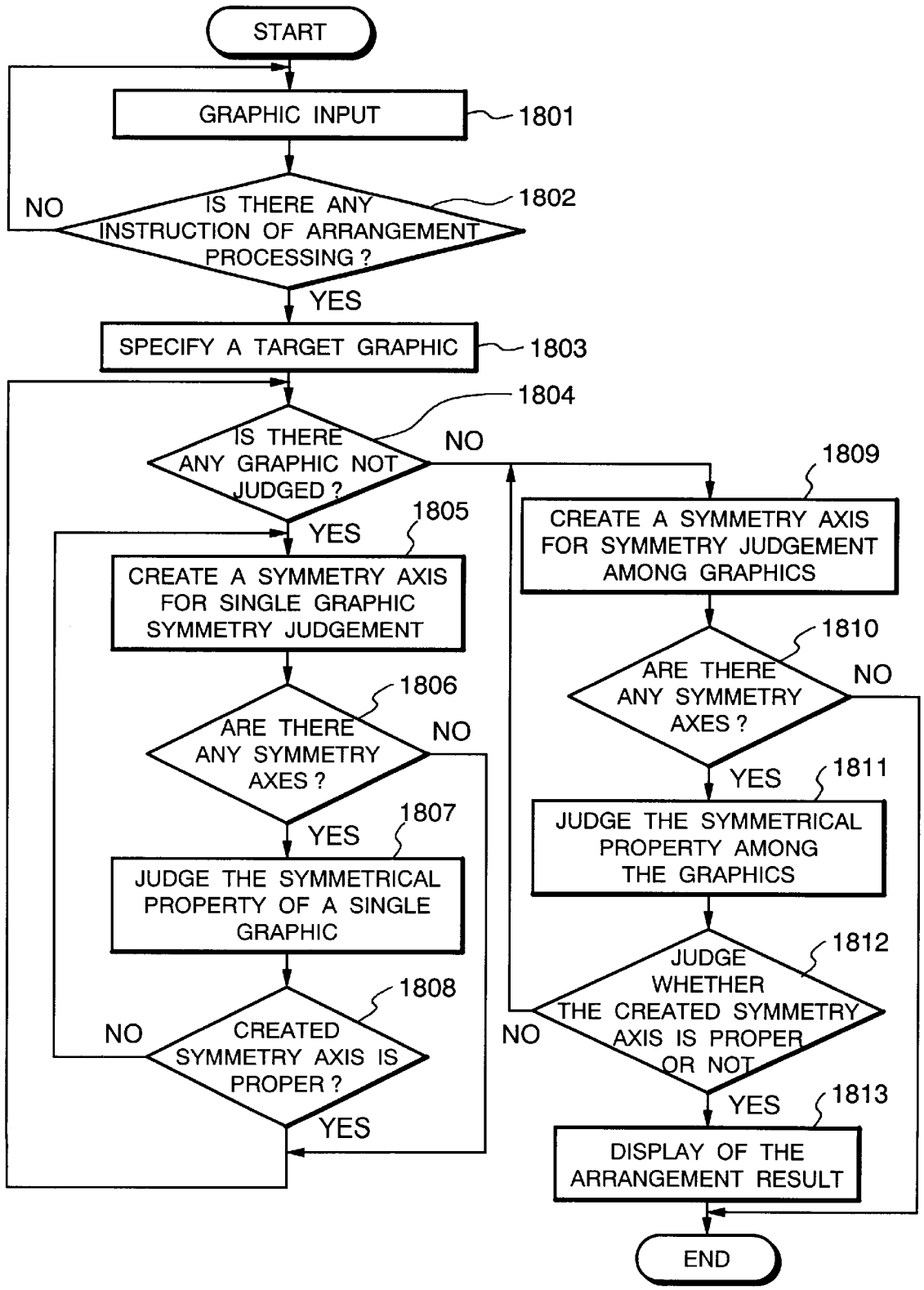
FIG. 18 is a flow chart showing an operation of the fifth embodiment.

FIG. 17 is a block diagram showing the construction of a line symmetrical graphic arrangement device according to a fifth embodiment of the present invention; FIG. 18 is a flow chart showing an operation of the same device; FIG. 19 is a view for use in describing a processing manner according to the same device.

As shown in FIG. 17, the line symmetrical graphic arrangement device of this embodiment comprises an input device 10b for entering graphic data, a data processing device 20d for performing the arranging of a graphic and the modification of the positional relation among the graphics, a storing device 30a for storing the graphic data, an output device 40a for displaying a graphic formed from the graphic data, and an instructing device 50b for supplying an instruction command to the data processing device 20d. Of the above components, the storing device 30a and the output device 40a have the same structure as those of the above-mentioned first embodiment, and the input device 10b has the same structure as that of the third embodiment. The data processing device 20d has the same structure as that of the fourth embodiment. Accordingly, the description thereof will be omitted here with the same reference numerals attached thereto.

The instructing device 50b is realized by a keyboard or mouse, and includes a line symmetrical arrangement processing instructing means 51 for issuing an instruction to perform line symmetrical arrangement and a target graphic indicating means 52 for specifying a graphic to be arranged to be line symmetric. The line symmetrical arrangement processing instructing means 51 is similar to that of the indicating device 50a of the first to fourth embodiments.

Next, the operation of the line symmetrical graphic arrangement device according to the fifth embodiment will be described with reference to the flow chart of FIG. 18 and FIG. 19.

Figure 19A:
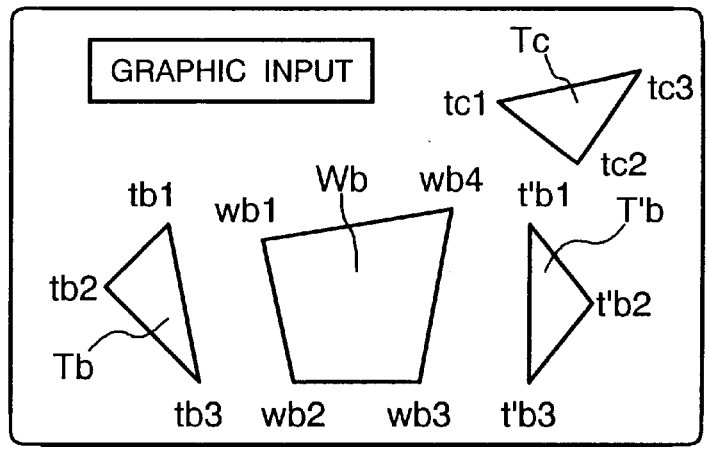
FIG. 19 is a view for use in describing the processing manner according to the fifth embodiment.
Figure 19B:
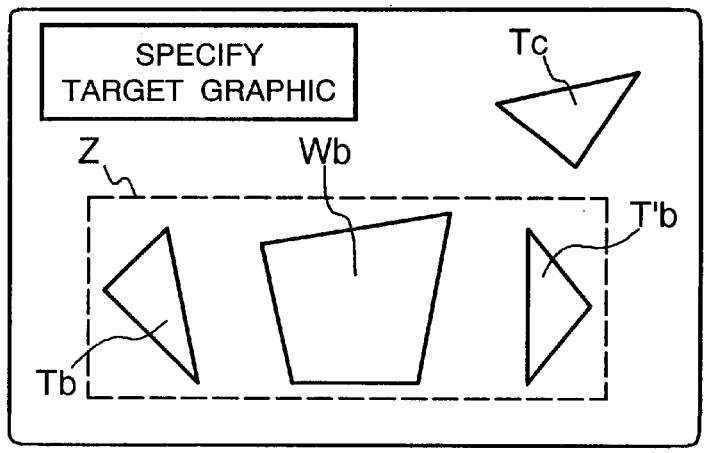

At first, when the graphics Wb, Tb, Tc, Tb' and Tc are entered by the graphic input means 11 of the input device 10b (Step 1801), the entered graphics Wb, Tb and Tb' and Tc are all stored in the graphic data storage area 31 of the storing device 30a. Graphic characteristic quantities such as the coordinates of the vertexes wb1, wb2, wb3 and wb4 of the graphic Wb, the coordinates of the vertexes tb1, tb2, tb3, tb'1, tb'2 and tb'3 of the graphics Tb and Tb', the angle and length of each side of these graphics, and the type of line of the graphics are stored as graphic data in the graphic data storage area 31. When the graphics Wb, Tb and Tb' and Tc are entered in the data processing device 20d, as shown in FIG. 19(A), they are displayed on the screen of the output device 40a as they are.

Figure 19C:
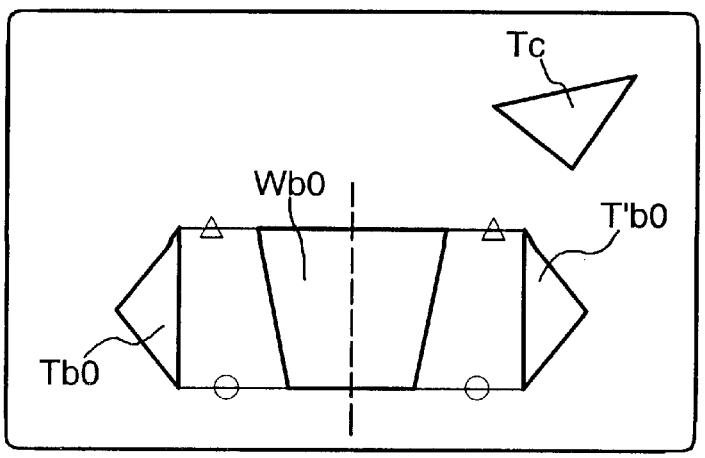

When all the graphics Wb, Tb and Tb' and Tc to be arranged have been entered, the operator operates the line symmetrical arrangement processing instructing means 51 to issue an instruction to the data processing device 20d so as to perform line symmetrical arrangement (Step 1802). When the instruction to perform the line symmetrical arrangement has been entered, the target graphic indicating means 52 requests to specify a target graphic to be processed or a group of graphics to be processed (Step 1803). Then, the operator specifies the group of the graphics Wb, Tb and Tb' displayed on the screen of the output device 40a, as shown by a dotted line frame Z in FIG. 19(B), and selects the target graphic group to be processed. The target graphic indicating means 52 analyzes the content specified on the screen while referring to the content stored in the graphic data storage area 31, and judges which graphic is a target to be processed. The judgement result is supplied to the data processing device 20d. Subsequently, a symmetry axis creating means 23, a single graphic symmetry judging means 211, a symmetry among-graphics judging means 212 and a symmetrizing processing means 22 of the data processing device 20d are operated to perform the processings in the same way as those of the fourth embodiment (Steps 1804 to 1813). Thus, as shown in FIG. 19(C), except for a graphic Tc that has not been selected as a target to be processed, the shapes of the graphics are arranged to be line symmetric and the positions of the graphics are modified so as to establish a line symmetric positional relation among them.

As set forth hereinabove, according to the constitution of the embodiment, the operator can select only the graphics desired as targets to be processed from a plurality of input graphics, and can arrange the graphics to have line symmetrical shapes and modify the positions of the graphics so as to establish the line symmetrical positional relation among them. As for graphics not desired to be processed by the operator, they can be remained as they are. Therefore, it is possible to edit the graphic exactly in correspondence with the demand of the operator.

Sixth Embodiment

Figure 20:
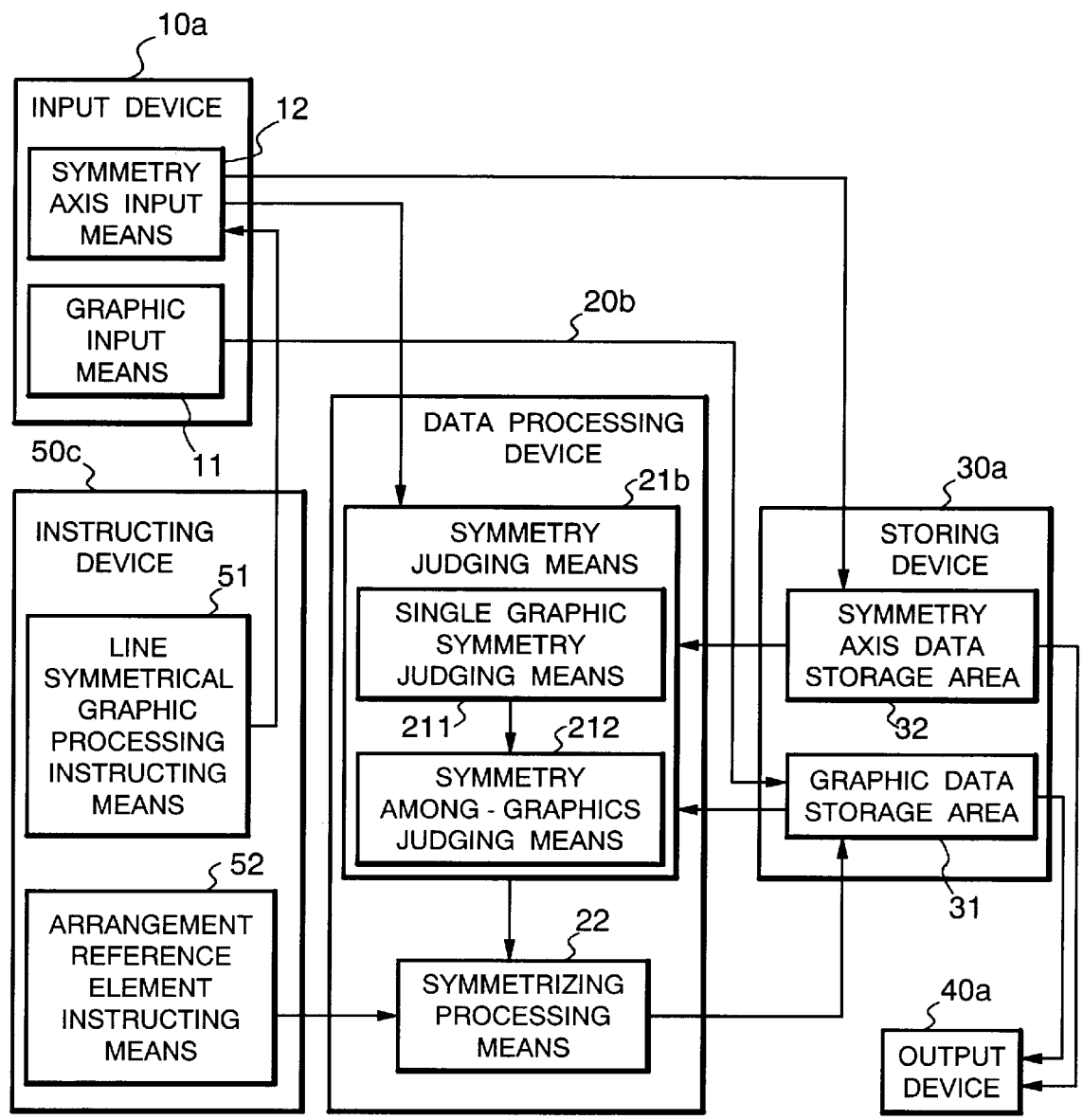
FIG. 20 is a block diagram showing the constitution of a line symmetrical graphic arrangement device of a sixth embodiment according to the present invention.
Figure 21:
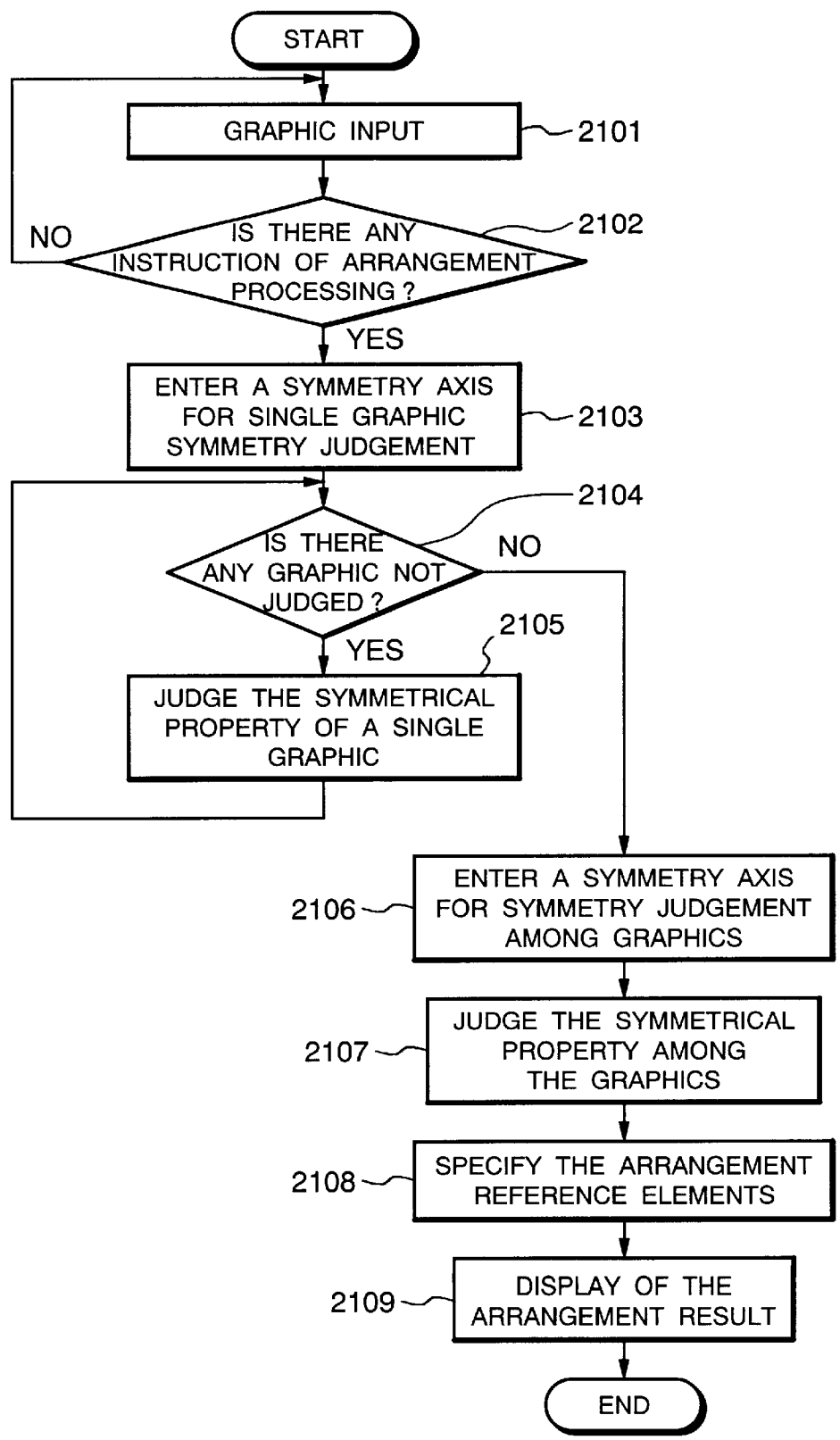
FIG. 21 is a flow chart showing an operation of the sixth embodiment.

FIG. 20 is a block diagram showing the constitution of a line symmetrical graphic arrangement device of a sixth embodiment according to the present invention; FIG. 21 is a flow chart showing an operation of the same device; FIG. 22 is a view for use in describing a processing manner of the same device.

As illustrated in FIG. 20, the line symmetrical graphic arrangement device according to this embodiment comprises an input device 10a for entering graphic data, a data processing device 20b for performing the arrangement of the graphics and the modification of the positional relation among the graphics, a storing device 30a for storing the graphic data, an output device 40a for displaying the graphics formed from the graphic data, an instructing device 50c for supplying an instruction command to the data processing device 20b. Of the above components, the input device 10a, the storing device 30a and the output device 40a have the same structure as those of the first embodiment as mentioned above, thereby omitting the description thereof with the same reference numerals attached thereto.

The instructing device 50c is realized by a keyboard or a mouse. The device 50c includes a line symmetrical arrangement processing instructing means 51 for instructing a line symmetrical arrangement processing and an arrangement reference element instructing means 53 for specifying characteristic quantities referred at the execution of line processing. The line symmetrical graphic processing instructing means 51 has the same structure as that of the instructing device 50a in the above-mentioned first to fourth embodiments.

An operation of the line symmetrical graphic arrangement device will be described with reference to the flow chart of FIG. 21 and FIG. 22.

Figure 22A:
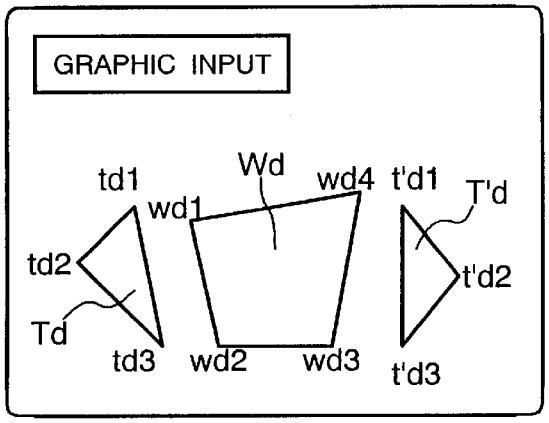
FIG. 22 is a view for use in describing the processing manner according to the sixth embodiment.
Figure 22B:
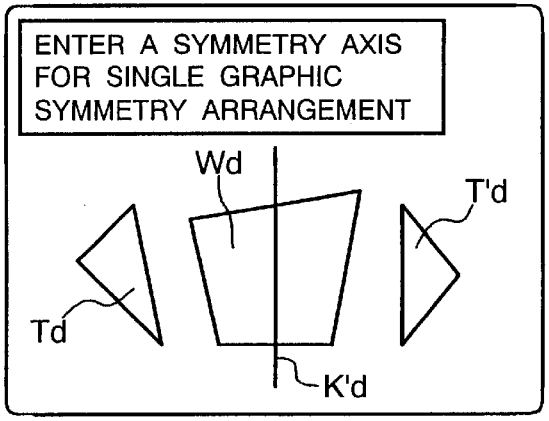
Figure 22C:
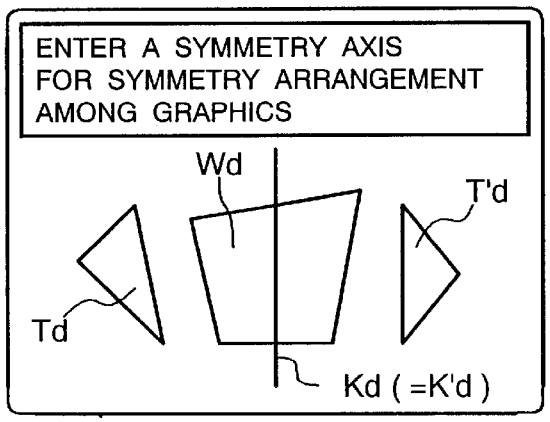

When the graphics Wd, Td and Td' are entered by the graphic input means 11 of the input device 10b (Step 2101), the entered graphics Wd, Td and Td' are all stored in the graphic data storage area 31 of the storing device 30a. Graphic characteristic quantities such as the coordinates of the vertexes wd1, wd2, wd3 and wd4 of the graphic Wd, the coordinates of the vertexes td1, td2, td3, td'1, td'2 and td'3 of the graphics Td and Td', the angle and length of each side of these graphics, and the type of line of the graphics are stored as graphic data in the graphic data storage area 31. When the graphics Wd, Td and Td' are entered in the data processing device 20b, as shown in FIG. 22(A), they are displayed on the screen of the output device 40a as they are.

When all the graphics Wd, Td and Td' to be arranged have been entered, the operator operates the line symmetrical arrangement processing instructing means 51 to issue an instruction to the data processing device 20b so as to perform line symmetrical arrangement (Step 2102).

Hereinafter, the operation including entry of a symmetry axis Kd' for judging symmetry of a single graphic, symmetry judgment in the shape of the graphic Wd, a symmetry axis Kd for judging symmetry among the graphics, and symmetry judgement in the positional relation between the graphics Td and Td' will be performed, similarly to the above mentioned second embodiment (Steps 2103 to 2107).

As a result of the above process, when the symmetry judging means 21b judges the graphics Wd, Td and Td' to be line symmetric in Step 2107, an operator operates the arrangement reference element instructing means 53 so as to specify the graphical elements and reference elements which may be a reference for arranging the graphics and modifying the position thereof and issue an instruction to the data processing device 20b (Step 2108). The instruction can be set up in such manners as; to adjust the position of the symmetry axis Kd to the graphics Wd, Td and Td' with the positions of the graphics Wd, Td and Td' fixed firmly (1); adjust the position of the graphics Td and Td' located on the both sides of the axis to the symmetry axis Kd with the position of the symmetry axis Kd fixed firmly (2); adjust the graphic Td' (Td) on the other side, by making the distance from each vertex of the graphic Td (Td') on either side of the axis to the symmetry axis Kd as a reference (3).

Figure 22D:
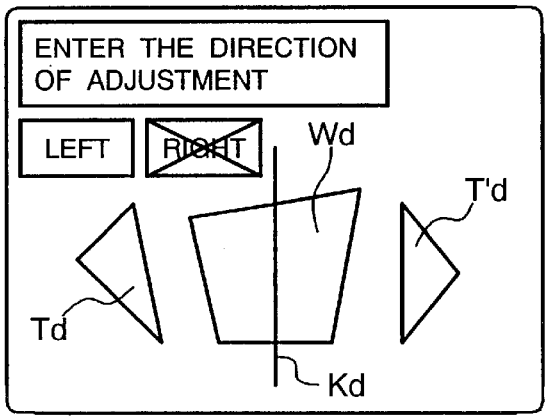
Figure 22E:
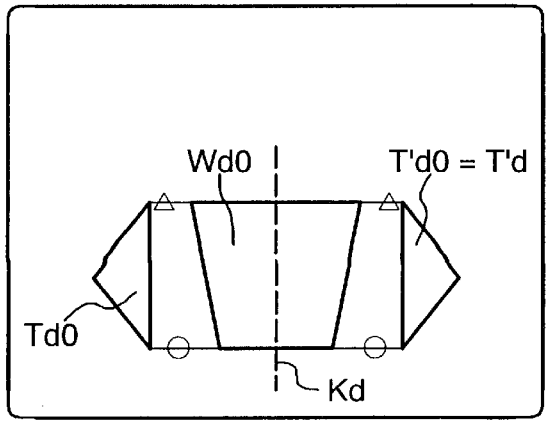
Figure 23A:
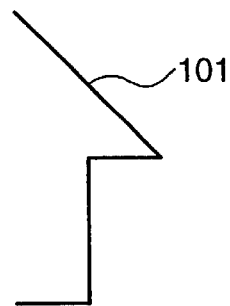
FIG. 23 is a view for use in describing the processing manner of a device according to the conventional technique.
Figure 23B:
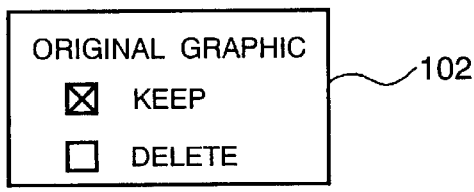
Figure 23C:
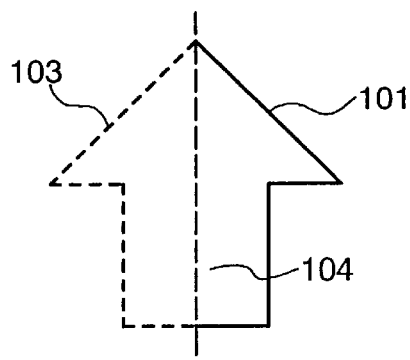
Figure 23D:
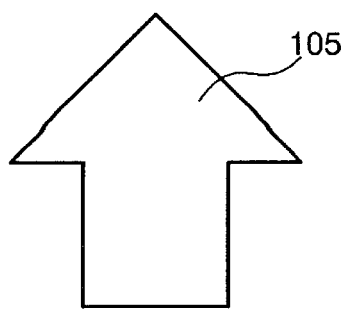
Figure 24:
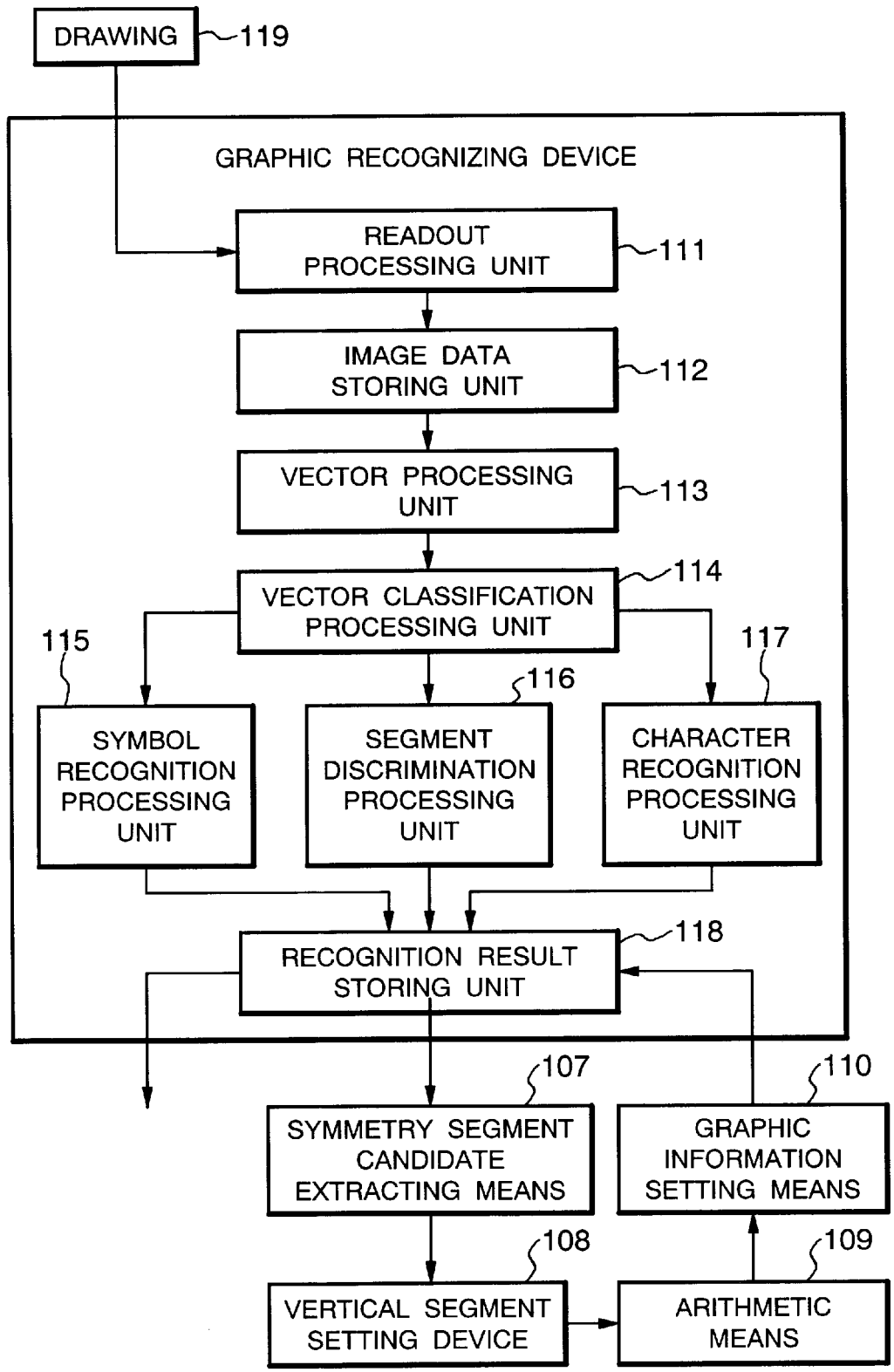
FIG. 24 is a block diagram showing the constitution of a device according to other conventional technique.
Figure 25:
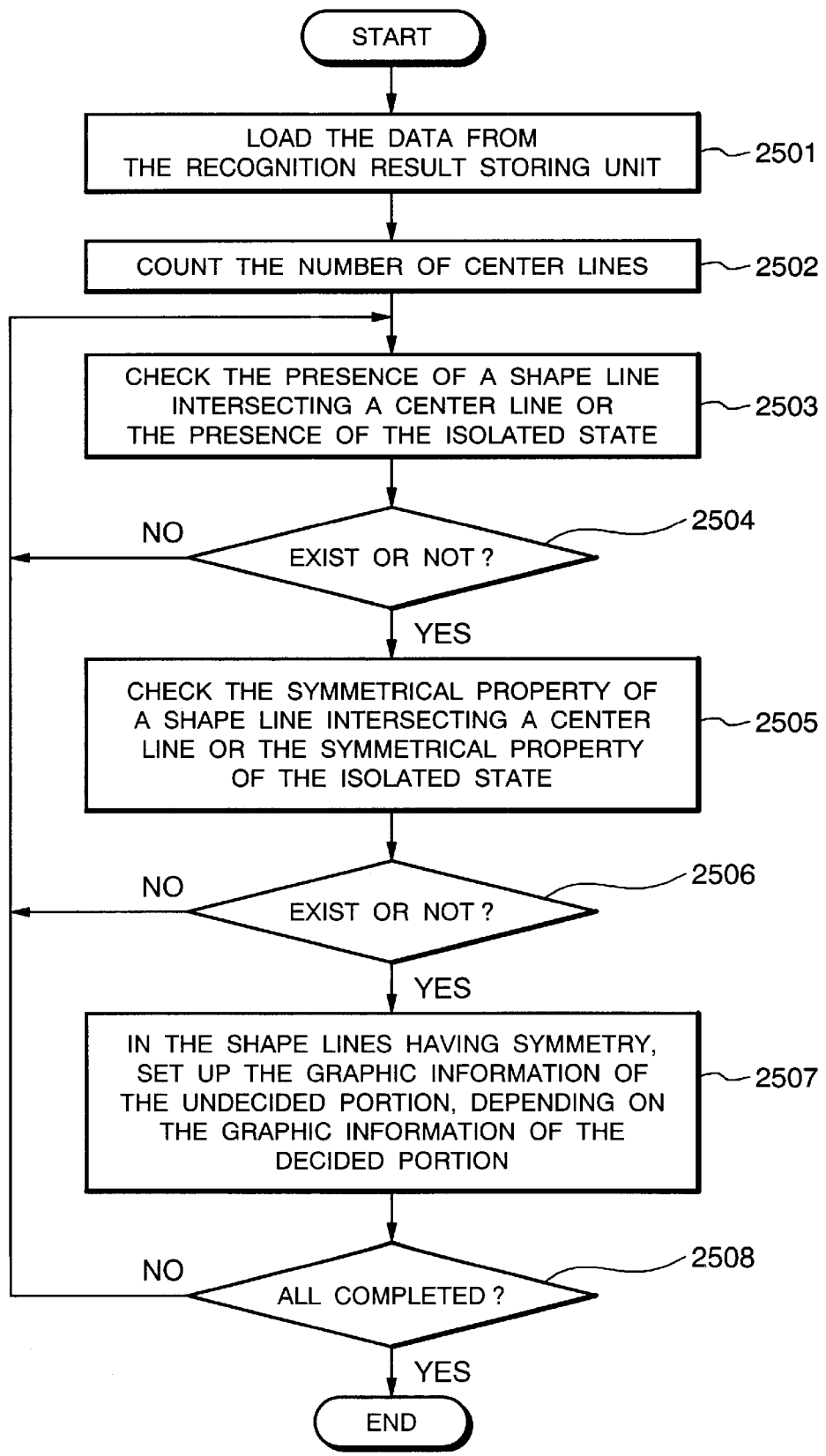
FIG. 25 is a flow chart showing an operation of the device of FIG. 24.
Figure 26:
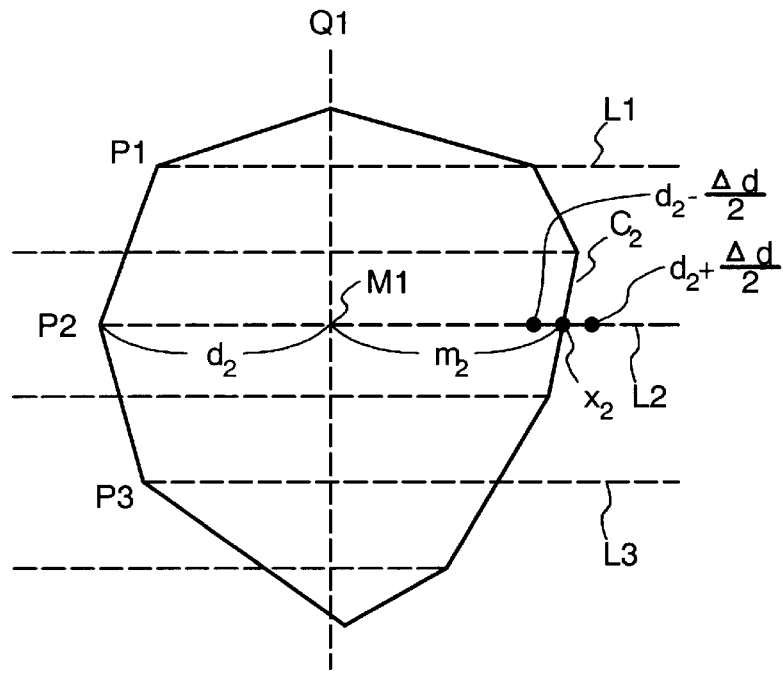
FIG. 26 is a view for use in describing the processing manner according to the device of FIG. 24.
Figure 27:
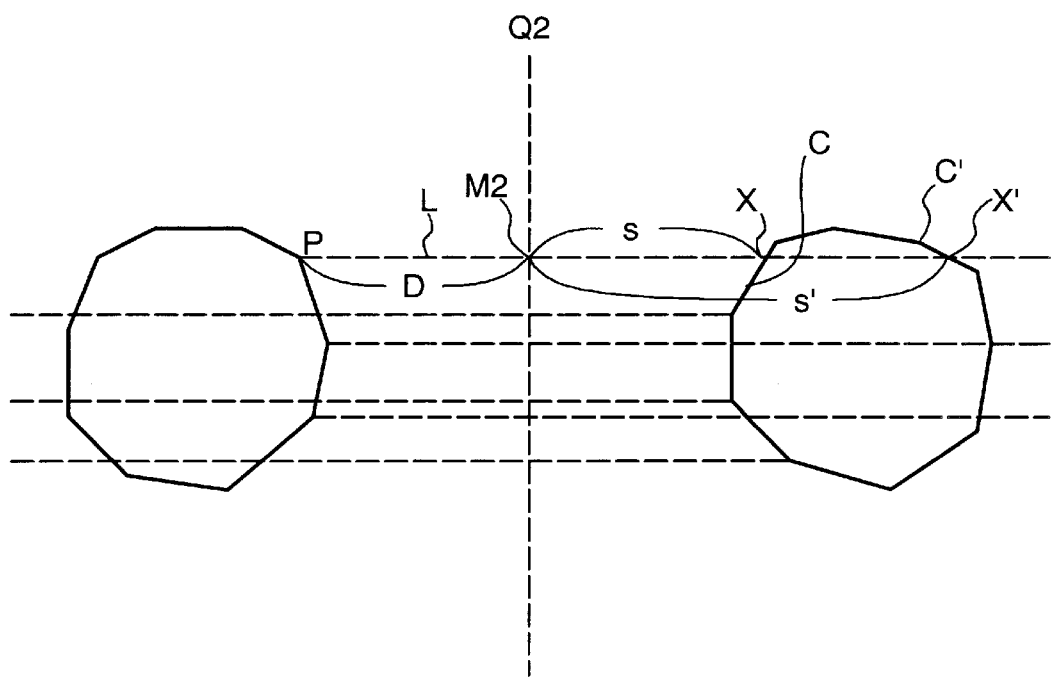
FIG. 27 is a view for use in describing the other processing manner according to the device of FIG. 24.

In the example of FIG. 22(D), if an operator gives an instruction that the distance from the graphic Td' on the right side of the figure to the symmetry axis Kd should be referred to as a criterion, the graphic Td on the left side of the figure is modified for a certain quantity and turned to be arranged into the graphic Td0. Owing to this, a view of line symmetrical disposition, in which the graphics Td and Td' are symmetrized with respect to the symmetry axis Kd, can be obtained.

As set forth hereinafter, according to this embodiment, an operator can specify the characteristic quantities or the like that should be referred to at execution time of processing, thereby editing the graphics correctly in accordance with the demand of the operator.

As described above, the line symmetrical graphic arrangement device according to the present invention is capable of arranging the graphics and modifying the positional relation among the graphics automatically by a simple input operation. Therefore, it is advantageous that the input graphics can be edited into a desired line symmetrical state at once.

Further, provided with a means of creating a symmetry axis automatically, the line symmetrical graphic arrangement device according to the present invention is capable of arranging the graphics and modifying the positional relation among the graphics, with respect to the symmetry axis automatically created. Therefore, it is not necessary for an operator to indicate a symmetry axis, thereby reducing the labor of the operator extremely.

Provided with a means of an operator's specifying the target graphics to be processed, the line symmetrical graphic arrangement device according to the present invention is capable of arranging the graphic and modifying the positional relation among the graphics, by selecting only the graphics specified by the operator and keeping the other graphics in the original shapes. Therefore, it is possible to edit the graphics correctly in accordance with the demand of the operator.

Provided with a means of an operator's specifying the graphic data referred to at execution time of processing, the line symmetrical graphic arrangement device according to the present invention is capable of arranging the graphics and modifying the positional relation among the graphics, with the graphic data specified by the operator as a reference, thereby to edit the graphics correctly in accordance with the demand of the operator.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A line symmetrical graphic arrangement device for automatically arranging an input graphic into a line symmetrical shape and displaying the arranged graphic, the arrangement device comprising:

a graphic input unit configured to enter graphic data, the graphic data including characteristic quantities indicating coordinates of vertices of the graphic data, the graphic data including a plurality of separate shapes;

a graphic data storing unit configured to store the graphic data entered from said graphic input unit;

an arrangement processing instructing unit configured to receive an operator instruction to perform an arrangement processing on the input graphic;

a symmetry axis creating unit configured to automatically create a first symmetry axis according to a predetermined rule, when an instruction is issued by said arrangement processing instructing unit based on the operator instruction provided to said arrangement processing instruction unit, the symmetry axis creating unit creating the first symmetry axis for each of the plurality of separate shapes, determining corresponding candidate first symmetry axes, by one of: a) acquiring each vertical bisector of a line connecting each of the corresponding characteristic quantities of the corresponding one of the separate shapes, and b) acquiring combinations of medial points of the corresponding one of the separate shapes, wherein the candidate symmetry axis for one of the plurality of separate shapes that is most symmetric with respect to all of the plurality of separate shapes is determined to be the first symmetry axis for the input graphic, the symmetry axis creating unit configured to automatically create a second symmetry axis according to the predetermined rule for remaining ones of the plurality of separate shapes besides the one of the plurality of separate shapes;

a symmetry axis storing unit configured to store the data of the symmetry axis created by said symmetry axis creating unit;

a symmetry judging unit configured to judge, in reply to the instruction of said arrangement processing instructing unit, whether the input graphic has a substantially line symmetrical shape or not with respect to the first and second symmetry axes, on the basis of the graphic data stored in said graphic data storing unit and the data of the symmetry axis stored in said symmetry axis storing unit, according to a predetermined criterion;

a symmetrizing processing unit configured to arrange the input graphic judged to be substantially line symmetric by said symmetry judging unit so as to be accurately line symmetric with respect to the first and second symmetry axes, on the basis of the graphic data stored in said graphic data storing unit and the data of the first and second symmetry axes stored in said symmetry axis storing unit; and an output unit configured to display the graphic arranged by said symmetrizing processing unit.

2. A line symmetrical graphic arrangement device as set forth in claim 1, wherein said symmetry judging unit judges whether the input graphic has a substantially line symmetrical shape or not with respect to the first and second symmetry axes passing through the input graphic, and said symmetrizing processing unit arranges the input graphic judged to have a substantially line symmetrical shape by said symmetry judging unit into an accurately line symmetrical shape with respect to the first and second symmetry axes.

3. A line symmetrical graphic arrangement device as set forth in claim 1, wherein said symmetry judging unit judges whether a plurality of the separate shapes of the input graphic have a substantially line symmetrical relation or not with respect to the second symmetry axis intervening between the input graphic, and said symmetrizing processing unit arranges the shapes of the separate shapes of the input graphic and modifies the positions thereof so that the input graphic judged to have the substantially line symmetric positional relation by said symmetry judging unit may be in the accurately line symmetric positional relation with respect to the second symmetry axis.

4. A line symmetrical graphic arrangement device as set forth in claim 1, wherein said symmetric judging unit judges whether the input graphic has a substantially line symmetrical shape or not with respect to the first and the second symmetry axis where the input graphic passes and judges whether a plurality of the separate shapes of the input graphic have a substantially line symmetric positional relation or not with respect to the first and the second symmetry axis intervening between the separate shapes of the input graphic, and said symmetrizing processing unit arranges the input graphic judged to have a substantially line symmetrical shape by said symmetry judging unit into an accurately line symmetrical shape with respect to the first and the second symmetry axis and arranges the shapes of the plurality of separate shapes of the input graphic and modifies the positions thereof so that the input graphic judged to have the substantially line symmetric positional relation by said symmetry judging unit may be in the accurately line symmetric positional relation with respect to the first and the second symmetry axis.

5. A line symmetrical graphic arrangement device as set forth in claim 1, further comprising:

a target graphic instructing unit for specifying one of the plurality of separate shapes of the input graphic to be arranged, in which device said symmetry axis creating unit automatically creates a symmetry axis according to the predetermined rule, for the one of the plurality of separate shapes of the input graphic specified by said target graphic instructing unit, and said symmetry judging unit judges, as for the one of the plurality of separate shapes specified by said target graphic instructing unit, whether the one of the plurality of separate shapes of the input graphic is substantially line symmetric or not with respect to the first symmetry axis.

6. A line symmetrical graphic arrangement device as set forth in claim 1, further comprising:

a target graphic instructing unit configured to specify one separate shape of the input graphic to be arranged, from a plurality of the separate shapes of the input graphic entered by said graphic input, in which device said symmetry axis creating unit automatically creates a first and a second symmetry axis according to the predetermined rule, for the one of the separate shapes specified by said target graphic instructing unit, said symmetry judging unit judges, for the one of the separate shapes specified by said target graphic instructing unit, whether the one of the separate shapes is substantially line symmetric or not with respect to the first symmetry axis passing through the input graphic, and said symmetrizing processing unit arranges the input graphic judged to have the substantially line symmetrical shape by said symmetry judging unit into an accurately line symmetrical shape with respect to the first and the second symmetry axis.

7. A line symmetrical graphic arrangement device as set forth in claim 1, further comprising:

a target graphic instructing unit configured to specify one separate shape of the input graphic to be arranged, from a plurality of the separate shapes of the input graphic entered by said graphic input, in which device said symmetry axis creating unit automatically creates a first and a second symmetry axis according to the predetermined rule, for the one of the separate shapes specified by said target graphic instructing unit, said symmetry judging unit judges, for the one of the separate shapes specified by said target graphic instructing unit, whether the one of the separate shapes is substantially line symmetric or not with respect to the first symmetry axis, and said symmetrizing processing unit arranges the shapes of the plurality of separate shapes of the input graphic and modifies the positions thereof so that remaining ones of the separate shapes of the input graphic judged to have the substantially line symmetric positional relation by said symmetry judging unit may be in the accurately line symmetric positional relation with respect to the second symmetry axis.

8. A line symmetrical graphic arrangement device as set forth in claim 1, further comprising:

a target graphic instructing unit configured to specify one separate shape of the input graphic to be arranged, from a plurality of the separate shapes of the input graphic entered by said graphic input unit, in which device said symmetry axis creating unit automatically creates a first and a second symmetry axis according to the predetermined rule, for the one of the separate shapes secified by said target graphic instructing unit, said symmetry judging unit judges, for the one of the separate shapes specified by said target graphic instructing unit, whether the one of the separate shapes is substantially line symmetric or not with respect to the first symmetry axis, and judges whether a subset of the plurality of the separate shapes have a substantially line symmetric positional relation with respect to the symmetry axis intervening between the subset of the plurality of the separate shapes, and said symmetrizing processing unit arranges the one of the plurality of separate shapes of the input graphic judged to have the substantially line symmetrical shape by said symmetry judging unit into an accurately line symmetrical shape with respect to the first symmetry axis and arranges the shapes of the plurality of separate shapes of the input graphic and modifies the positions thereof so that remaining ones of the separate shapes of the input graphic judged to have the substantially line symmetric positional relation by said symmetry judging unit may be in the accurately line symmetric positional relation with respect to the second symmetry axis.

9. A line symmetrical graphic arrangement device as set forth in claim 1, further comprising:

a reference element instructing unit for specifying a predetermined data from the graphic data stored in said graphic data storing unit, in which device said symmetrizing processing unit edits the input graphic with reference to the graphic data by said reference element instructing unit.

10. A line symmetrical graphic arrangement device as set forth in claim 1, further comprising:

a target graphic instructing unit configured to specify one separate shape of the input graphic to be arranged, from a plurality of the separate shapes of the input graphic entered by said graphic input unit; and a reference element instructing unit for specifying a predetermined data from the graphic data stored in said graphic data storing unit; in which device said symmetry axis creating unit automatically creates a first and a second symmetry axis according to the predetermined rule, for the one of the separate shapes specified by said target graphic instructing unit, said symmetry judging unit judges, for the one of the separate shapes specified by said target graphic instructing unit, whether the one of the separate shapes is substantially line symmetric or not with respect to the first symmetry axis, and said symmetrizing processing unit edits the input graphic with reference to the graphic data by said reference element instructing unit.

11. A method for arranging graphic data, comprising:

a) inputting the graphic data, the graphic data including a plurality of separate shapes having corresponding characteristic quantities;

b) displaying the input graphic data on a display;

c) receiving an input, from a user, for performing a line symmetric arrangement of the graphic data;

d) determining whether a candidate symmetry axis exists for one of the plurality of separate shapes of the input graphic data, the corresponding candidate symmetry axis being determined based on the respective characteristic quantities of the one separate shape;

e) if the determination in the step d) is no, going back to step d) and performing the determination for a next one of the plurality of separate shapes;

f) if the determination in the step d) is yes, determining whether all of the other separate shapes, as a combined separate shape, are line symmetric with respect to the candidate symmetry axis determined in the step d);

g) if the determination in the step f) is yes, then performing accurate alignment of the plurality of separate shapes with respect to the candidate symmetry axis; and h) if the determination in the step f) is no, going back to the step d) and performing the determination for a next one of the separate shapes of the input graphic.

* * * * *